I

United States Patent
Beckman et al.

(10) Patent No.: US 9,778,135 B1
(45) Date of Patent: Oct. 3, 2017

(54) MOBILE TUNNELS FOR OPERATIONAL TESTING

(71) Applicant: Amazon Technologies, Inc., Seattle, WA (US)

(72) Inventors: Brian C. Beckman, Newcastle, WA (US); Gershon Parent, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 336 days.

(21) Appl. No.: 14/656,531

(22) Filed: Mar. 12, 2015

(51) Int. Cl.
*G01M 9/04* (2006.01)
*G01M 9/02* (2006.01)

(52) U.S. Cl.
CPC ............... *G01M 9/04* (2013.01); *G01M 9/02* (2013.01)

(58) Field of Classification Search
CPC ................................ G01M 9/02; G01M 9/04
See application file for complete search history.

(56) References Cited

U.S. PATENT DOCUMENTS

| 5,501,101 A | * | 3/1996 | Purcell | G01M 9/02 73/147 |
| 2007/0137717 A1 | * | 6/2007 | Vakili | G01M 9/04 138/39 |
| 2013/0239670 A1 | * | 9/2013 | Meis | F25C 1/00 73/118.03 |
| 2016/0363505 A1 | * | 12/2016 | Sterling | G01N 17/002 |

FOREIGN PATENT DOCUMENTS

KR     2020030019897     * 11/2003 ............ G01M 9/00

* cited by examiner

*Primary Examiner* — Paul West
(74) *Attorney, Agent, or Firm* — Arthorus, PLLC

(57) ABSTRACT

Mobile tunnels may be provided on trailers or in association with one or more other vehicles. A mobile tunnel may be towed or otherwise accelerated to a sufficient velocity, thereby causing a fluid such as air or seawater to travel above, below and around the tunnel. The fluid may be diverted into the tunnel and caused to pass over a test object such as an unmanned aerial vehicle or unmanned undersea vehicle within the tunnel, thereby enabling aerodynamic testing or hydrodynamic testing of the test object to be performed. Additionally, one or more materials may be injected into the fluid, thereby enabling destructive testing of the test object to be performed.

21 Claims, 19 Drawing Sheets

MOBILE TUNNELS FOR OPERATIONAL TESTING

BACKGROUND

Wind tunnels are hollow structural facilities in which the aerodynamic qualities and durability of rigid objects such as vehicles or buildings may be evaluated. For example, a prototype of an airplane may be placed within a wind tunnel and subjected to artificially generated flows of air or other gases in order to evaluate the effects of aerodynamic forces or moments on the airplane, such as by simulating flight. Additionally, the air or other gases may be charged with particulate matter or liquids in order to simulate the destructive effects that such materials may have on the airplane when the airplane comes into contact with such gases, particulate matter or liquids during actual flight at various speeds or altitudes, or to provide visible indications of the flows of the air or other gases. Likewise, a model of a dwelling or other building may be constructed or installed within an air tunnel, in order to simulate the effects of adverse weather events on dwellings or buildings of similar sizes or shapes. Air flows within a wind tunnel may be generated by one or more fans or like machines, e.g., devices having one or more rotating bladed impellers, which may be oriented to cast air upon objects being evaluated at desired pressures or velocities.

By their very nature, wind tunnels must be constructed according to strict design requirements and include specialized equipment for performing any operational tests that may be desired. For example, the wind tunnel must include an enclosure around a testing environment that is large enough to accommodate any and all objects or prototypes thereof that may be subjected to such operational tests, from jumbo jets to single-rotor helicopters, or from single-family homes to apartment buildings. For this reason, many wind tunnels are of the "one-size-fits-all" variety, and are designed and built to accommodate the largest of such objects or prototypes. Because different objects may be expected to encounter flows of air or other gases at different velocities or pressures, a multipurpose wind tunnel must include fans, turbines, motors, machinery, or other pressure sources for generating flows of such gases at desired velocities or pressures. Likewise, the enclosures within which such machinery and the objects to be tested are provided must also be designed to accommodate and withstand not only the flows of gases at such velocities or pressures but also the physical impact of any particles or liquids that may be charged or injected into such flows for simulation purposes.

The rigorous structural and mechanical requirements that wind tunnels must satisfy necessarily increase their costs. Furthermore, when maintenance or repairs are performed on any aspect of a wind tunnel, the entire wind tunnel must be shut down and secured until such maintenance or repairs have been satisfactorily completed.

DETAILED DESCRIPTION

As is set forth in greater detail below, the present disclosure is directed to mobile tunnels for operational testing. More specifically, the systems and methods disclosed herein include wind tunnels or like facilities that are provided in association with mobile vehicles, such as tractor-trailers or like machines. In some implementations, the tunnels or vehicles disclosed herein may be designed to travel at any speeds, such as traditional highway speeds of sixty to ninety miles per hour (60-90 mph), depending on the properties of the fluids within which the tunnels or vehicles are traveling, or the purpose for which the tunnels or vehicles are provided. The tunnels may rely on fluid flow that may be encountered around such tunnels or such vehicles while traveling at such increased speeds, and may divert some or all of such fluid flow into the tunnels for operational testing of one or more objects that may be contained therein.

Figure 1A:
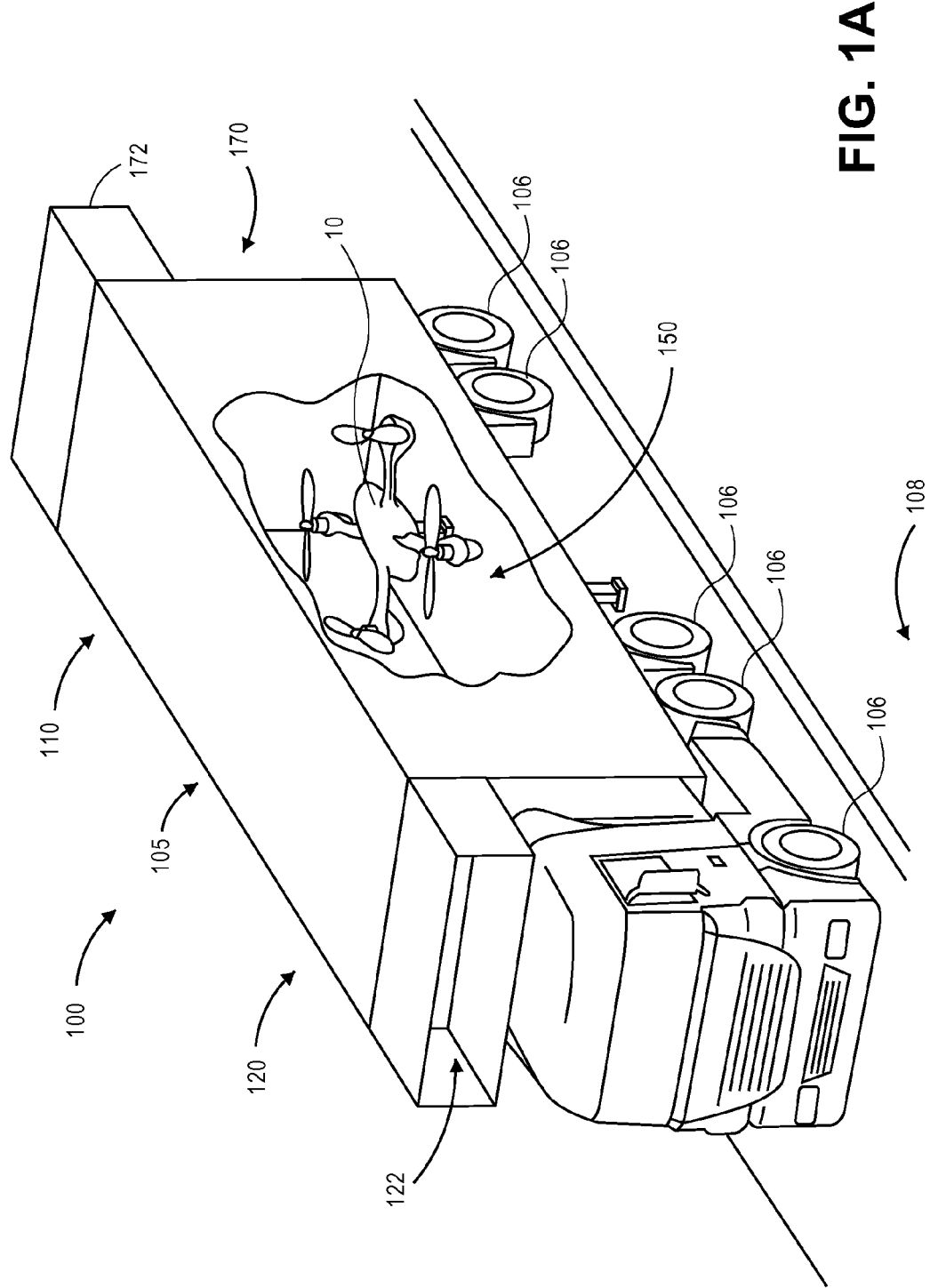
FIGS. 1A and 1B show views of one embodiment of a system including a mobile tunnel, in accordance with embodiments of the present disclosure.
Figure 1B:
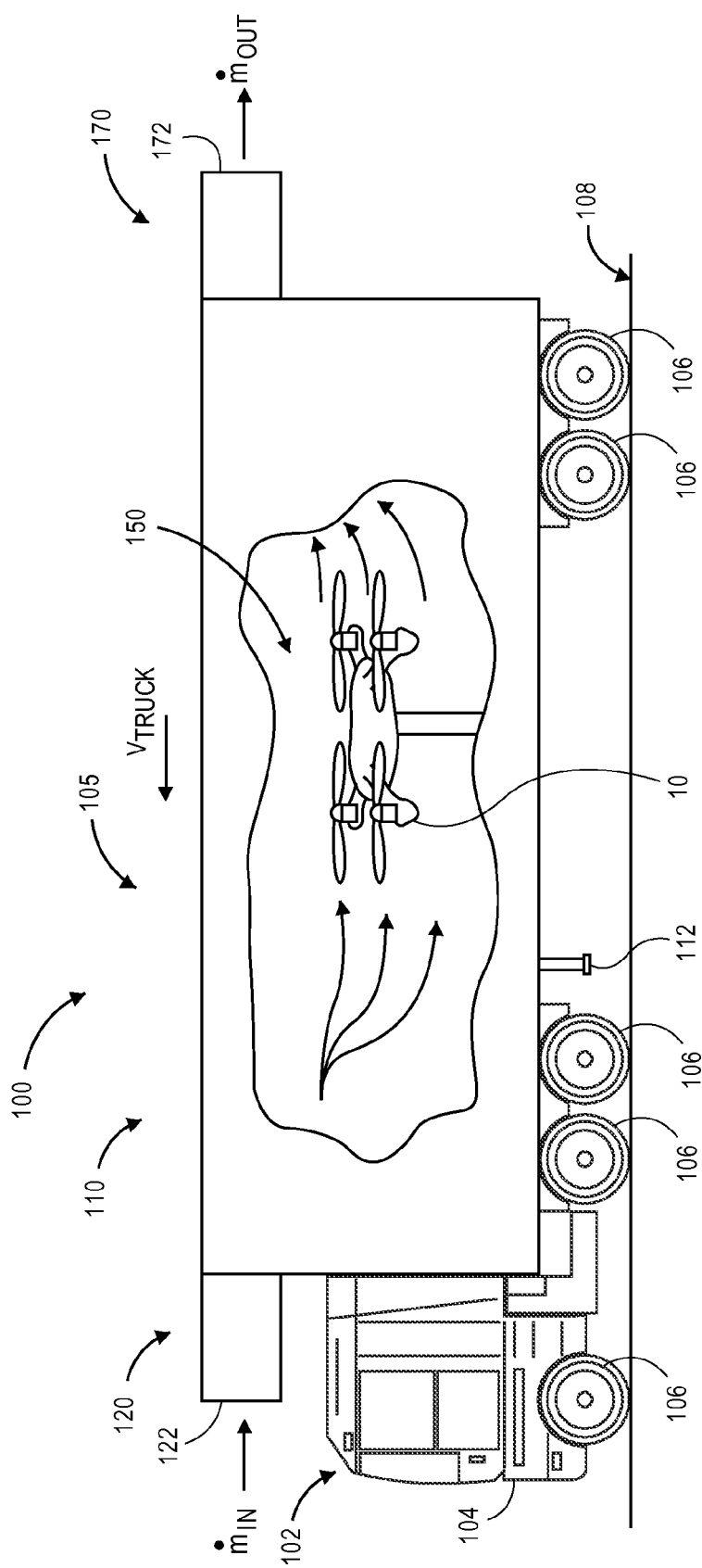

Referring to FIGS. 1A and 1B, views of one embodiment of a system 100 including a mobile tunnel 105 for performing testing operations on a vehicle 10, such as an unmanned aerial vehicle (or UAV), or a drone, in accordance with the present disclosure are shown. As is shown in FIG. 1A, the system 100 includes a road tractor 102 having a traction engine 104 and a plurality of wheels 106 provided on a roadway (e.g., a street or highway) 108. The tractor 102 of FIG. 1A is shown as towing the mobile tunnel 105, which includes a trailer 110 having landing gear 112 and a plurality of wheels 116. The trailer 110 further includes an ingress section 120, a test section (or test cell) 150 and an egress section 170.

The ingress section 120 includes an air intake 122 provided at an upper fore portion of the trailer 110, above the tractor 102, and is configured to receive a flow of air while the mobile tunnel 105 is in motion. The test section 150 further includes the vehicle 10, which may be tethered or untethered therein. The egress section 170 further includes an air outlet 172 provided at an upper aft portion of the trailer 110. The ingress section 120, the test section 150 and the egress section 170 are in fluid communication with one another, and define a flow path extending through the tunnel 105 between the air intake 122 and the air outlet 172.

As is shown in FIG. 1B, as the mobile tunnel 105 travels down the roadway at a speed $V_{TRUCK}$, an inward flow of air at a mass flow rate of mix enters the tunnel 105 at the ingress section 120 by way of the air intake 122. The air travels from the ingress section 120 to the test section 150, where the air moves over and around the shape of the vehicle 10 before transitioning to the egress section 170 and out of the tunnel 105 at the air outlet 172, at a mass flow rate of $m_{OUT}$, which is substantially equal to the mass flow rate $M_{IN}$.

Accordingly, the systems and methods of the present disclosure may include or operate one or more tunnels that are provided in or by one or more trailers or other vehicles and placed into motion. Objects may be placed within such tunnels, which may be configured to receive flowing fluids such as air passing by the trailers or other vehicles (e.g., above, below or around such vehicles), and to cast such fluids onto the objects within the tunnels, and to discharge such fluids from one or more outlets provided on such trailers or other vehicles. The tunnels may include any number or type of sensors (e.g., sensors of velocities or pressures within the tunnels, as well as one or more imaging devices) for determining whether the conditions within the tunnels are appropriate for commencing or conducting testing operations, or for observing or capturing information or data regarding such conditions or the status of the objects when subjected to such conditions. Based on any information or data regarding the objects or the conditions within the tunnels, one or more determinations regarding the suitability of such objects under such conditions may be made.

In this regard, by installing or providing one or more of the tunnels disclosed herein within a sufficiently sized vehicle, e.g., a trailer, placing the vehicle into motion at elevated speeds and diverting at least a portion of the fluid flow passing above, below or around the vehicle into the tunnel, operational testing of devices or prototypes thereof (e.g., aerodynamic testing, hydrodynamic testing or destructive testing) may be conducted according to any predetermined operational standards within a flexible and compact environment at low costs and in a variety of adjustable conditions.

Wind tunnels are controlled environments in which the aerodynamic properties and durability of one or more objects may be evaluated. More particularly, in a wind tunnel, flows of air or other gases across objects such as vehicles, structures or other objects may be monitored and tracked in order to provide a greater understanding as to the effects of forces, moments, and other wind-related effects on such objects. Information regarding such effects may be used to confirm the suitability or reliability of a design of an object, to alter the design, or to design other objects.

Wind tunnels generally comprise hollow tube-like environments formed in open-circuit or closed-circuit paths that include fans or other prime movers for generating a flow of air or other gases throughout the environments and along the paths. Wind tunnels may further include a number of sensors or other instruments such as pitot tubes, anemometers or pressure sensors, as well as imaging devices, which may detect and track information or data regarding the object and the flow of air or gases over the object at an interface that is sometimes called a "boundary layer." Some of the information or data that may be detected and tracked may include, but is not limited to, pressures, velocities, densities, temperatures, viscosities, or compressibilities of the flowing gases, as well as moments or forces such as lift, drag, pitch, yaw or roll on the objects. Moreover, the objects themselves may be configured with one or more sensors or other telltale indicators of the flow conditions within the wind tunnel, including one or more pressure sensors provided on a skin or outer layer of an object, as well as one or more tufts, or one or more elongated strands or attachments of lightweight material dangling from the object, which visibly indicate the paths taken by air traveling over the object.

Additionally, wind tunnels may include one or more portals, windows or other visual openings through which the effects of the air or gases on the objects may be observed, e.g., by human eyes or one or more imaging devices. The effects of air or other gases on an object may be enhanced by one or more flow visualization techniques. For example, a testing environment may be charged with smoke, dyes, vapors or other fine materials that travel within the airflow and enable the air flowing over an object to be observed with greater detail. Wind tunnels may also include one or more components for modifying the direction of airflow prior to or within a testing environment, or changing the pressure of the airflow, and removing any turbulence therefrom. Wind tunnels may also be configured to evaluate the effects of airflow on objects that are either stationary or in motion.

Originally, wind tunnels were provided for use on a trial-and-error basis, such that an object would be designed and constructed, and placed into a wind tunnel to determine whether the design of the object was suitable for the purposes for which the object was intended. With the evolution of advanced computer-based design techniques, wind tunnels now have value as a final validator of a computer-generated design, e.g., to confirm the effects of the behavior of air or other gases on the object, and to operate in concert with techniques.

Those of ordinary skill in the pertinent arts recognize that wind tunnels may be used to evaluate an actual design of an object, or a prototype of the actual design. Where a prototype is evaluated, those of ordinary skill in the pertinent arts will recognize that the suitability of such an evaluation will be determined based on principles of dimensional analysis and similarity. For example, when testing a prototype within a wind tunnel, one or more parameters may be matched between the wind tunnel testing environment and the environment in the objects to be tested are reasonably expected to operate. One such parameter is the mass ratio, or $\rho L^3/M$, where $\rho$ is the density of a fluid within the wind tunnel, L is a representative length of an object being evaluated within the wind tunnel, and M is a mass of the object. Matching the mass ratio within the wind tunnel to the mass ratio within the working environment in which the object is to be operated confirms that the ratio of the density of the fluid will match the density of the object in both the testing and working environments.

Another such parameter is the Froude number, or $v/\sqrt{(Lg)}$, where v is the relative velocity of the object, and g is the acceleration due to gravity. Matching the Froude number inside and outside the wind tunnel ensures that the ratio of gravitational to inertial forces generated by the flow of air is substantially equal in both the testing and actual environments. Finally, yet another parameter that may be matched is the Reynolds number, or $vL/\nu$, which represents a ratio between inertial forces and viscous forces, which are also preferably equal in both the testing and actual environments.

Wind tunnels may be designed to accommodate the flow of air or other gases at any speed, including subsonic (e.g., speeds of less than two hundred fifty miles per hour, or 250 mph), transonic (e.g., speeds between two hundred fifty miles per hour and the speed of sound, or about 768 mph), or supersonic (e.g., speeds greater than the speed of sound).

While airflows in subsonic wind tunnels may be generated by one or more fans or other like devices, airflows in transonic or supersonic wind tunnels are typically generated using compressed air or other gases that are stored in tanks and released into the controlled environment of the wind tunnel.

In this regard, wind tunnels are essential tools for physically confirming the validity and durability of attributes of a theoretical design. By subjecting an object such as an airplane or a building, or a sufficiently sized prototype of the object, to wind or other environmental conditions that may be expected to be encountered by the object, actual aerodynamic information regarding the behavior or performance of the object in such conditions may be gathered, and designs may be verified or subsequently refined accordingly.

Because wind tunnels must meet rigorous structural and mechanical requirements, wind tunnels are often extremely large facilities that can accommodate very large objects such as vehicles or structures. For example, the National Full-Scale Aerodynamic Complex (NFAC) at the Ames Research Center of San Jose, Calif., is typically recognized as having the world's largest wind tunnel. The NFAC wind tunnel is approximately one hundred eighty feet (180 ft) tall, more than fourteen hundred feet (1400 ft) long, and is large enough to accommodate airplanes having one hundred foot (100 ft) wingspans. The NFAC wind tunnel includes two test sections, one that is eighty feet (80 ft) high and one hundred twenty feet (120 ft) wide, and another that is forty feet (40 ft) high and eighty feet (80 ft) wide. The NFAC wind tunnel also operates six fans with each fan having fifteen blades and a diameter equivalent to a height of a four-story building, and being powered by a 22,500 horsepower (22,500 HP) motor.

While modern wind tunnels are typically constructed of immense sizes and impressive scopes, such wind tunnels are often very expensive to construct, operate, and maintain. For example, wind tunnels that feature large fans operating at high speeds typically must consume vast quantities of electricity or power obtained from other sources, as the forces of drag on an object are proportional to a square of the velocity (e.g., the velocity to the second power) of airflow around the object, while the power required to maintain a fan rotating are proportional to a cube of the velocity (e.g., the velocity to the third power) of the airflow. However, with the emergence of small aircraft and other vehicles, including both manned and unmanned aircraft, such as drones, wind tunnels of such sizes and scopes are not required in order to conduct either aerodynamic or destructive testing on such vehicles.

The systems and methods of the present disclosure are directed to mobile tunnels that may be mounted to or otherwise provided in association with one or more vehicles, including but not limited to a specifically configured trailer-type apparatus that is towed by a road tractor or like vehicle, and provided for the operational testing of one or more objects. The systems and methods disclosed herein may provide such tunnels within trailers or like vehicles, and may be configured to receive fluid flow via an ingress section, and to discharge the fluid flow via an egress section. Within the tunnels, a conditioning section may modify the fluid flow in order to meet one or more operational conditions, e.g., pressures, velocities, temperatures or other like factors, using one or more conditioning elements such as vanes, screens, filters or flow straightening or flow separating devices. A test section may accommodate an object to be evaluated, which may include any type of vehicle or structure such as an airplane, a vehicle (e.g., a bicycle, a car, a boat, a train car that may be tethered or untethered therein) or a structure (e.g., a modular building).

According to some embodiments, one type of vehicle that may be evaluated within a mobile wind tunnel in accordance with the present disclosure is a relatively small UAV, or drone, that is configured primarily for substantially horizontal cruising travel (e.g., with few or minimal changes in elevation). Additionally, the mobile tunnels of the present disclosure may include one or more observation sections, in which one or more designers, engineers or testing personnel may visibly observe, conduct or control operational testing of an object within a mobile tunnel, e.g., through one or more windows or portals, or on a display monitor, and operate one or more computer systems for conducting the testing or observing results of such testing.

The tunnels disclosed herein may be constructed in any type of moving vehicle or carrier, or in association with any type of moving vehicle or carrier, e.g., a non-motorized trailer or other type of vehicle configured for towing by a motorized tractor or other engine. Moreover, those of ordinary skill in the pertinent art will recognize that the tunnels disclosed herein may be provided in combination with one or more engines or prime movers, e.g., a combination tractor-trailer, with separate operational (e.g., driving or controlling) and testing compartments, or a van or truck with combined operational and testing components in a single compartment. Additionally, the tunnels of the present disclosure may rely exclusively on the fluid flow (e.g., air or water) passing above, below, or around the tunnels to generate velocities or pressures that may be required in order to conduct operational testing. Alternatively, one or more fans, turbines or other impellers driven by motors or other prime movers to adjust (e.g., increase or decrease) the pressures or velocities of the fluid flow therein.

In some embodiments, wind tunnels may be constructed within modified or refurbished standard trailers having widths of eight to eight-and-one-half feet (8-8.5 ft), and heights of approximately thirteen feet (13 ft), along with lengths of approximately twenty-five feet to fifty-five feet (25-55 ft). Such trailers may have any number of wheels and/or axles, e.g., two axles and eight wheels, three axles and twelve wheels, or four axles and sixteen wheels, with volumes ranging from one thousand to four thousand cubic feet (1,000-4,000 cu. ft.) and tares of ten thousand to fifteen thousand pounds (10,000-15,000 lbs.). Additionally, wind tunnels may also be provided in specially constructed trailers or other vehicles, with widths of approximately twelve feet (12 ft) or more, and any desired length, volume, mass, or tare. Tunnels may also be provided in airborne vehicles, e.g., airplanes, with specially configured cargo spaces for receiving at least some of the wind passing over and around the vehicles. The wind may be passed over one or more airplanes, airships or other vehicles, or prototypes thereof, provided within a cargo space, and discharged overboard. Likewise, one or more tunnels may be provided in a submersible vehicle, e.g., a submarine, including one or more cargo spaces for receiving seawater passing over and around the submersible. The seawater may be passed over or around one or more surface craft or other submersibles, or prototypes thereof, provided within such cargo spaces and discharged overboard. Those of ordinary skill in the pertinent arts will recognize that the tunnels described herein may be provided in or as a part of any type of vehicle in accordance with the present disclosure. For example, in addition to trailers, some of the wind tunnels disclosed herein may be formed as modules or capsules that may be placed upon a standard trailer and towed or pulled along a roadway by any type or form of motorized vehicle.

Those of ordinary skill in the pertinent arts will further recognize that the tunnels described herein may be sized and/or shaped in order to maximize efficiency and fluid flow, or to otherwise satisfy any airflow requirements associated with operational testing to be performed therein, with ingress sections and egress sections (e.g., intakes and outlets) provided accordingly. For example, because most trailers have widths of eight to eight-and-one-half feet (8-8.5 ft), wind tunnels of such widths may be readily formed within standard trailers. Because most highways in the United States have widths of at least twelve feet (12 ft), some wind tunnels may be formed of widths of up to twelve feet (12 ft) and operated on such highways without unduly impacting other traffic, e.g., by bearing signs reading "OVERSIZE LOAD" or like markings. Alternatively, wind tunnels wider than twelve feet (12 ft) may be operated on standard highways in some jurisdictions after obtaining specific permits or satisfying one or more legal requirements, or on sufficiently flat and open areas (e.g., test tracks, defunct runways or other large, paved areas) that are restricted to vehicular traffic, without regard for other vehicles.

Additionally, those of ordinary skill in the pertinent arts will also recognize that interior portions of the tunnels disclosed herein may also be sized and/or shaped in a manner consistent with the operational testing to be performed therein, and to accommodate any objects (e.g., vehicles) on which such operational testing is to be performed. For example, sections of tunnels disclosed herein and paths between such sections are preferably free from obstructions or extensions that might adversely affect the flow of air, water or other gases or liquids therethrough, or minimize or eliminate any turbulence. Such sections and passages may be sized to accommodate one or more specific objects, such as various types of vehicles (e.g., aircraft, bicycles, cars, trucks, or train cars) that may be tethered or untethered therein. Furthermore, the tunnels may be formed in a modular manner, with stations, passages, or components that may be inserted or removed from such tunnels based on the operational testing or evolutions to be performed therein. The tunnels may be formed of single vehicles or trailers, or from vehicles or trailers aligned in tandem and joined together, e.g., by one or more conduits, passageways or articulators formed from flexible materials such as plastics or rubbers.

The tunnels of the present disclosure may also be formed from any materials that are suitably strong and durable to withstand the operational requirements of one or more evolutions to be performed therein (e.g., aerodynamic testing, hydrodynamic testing and/or destructive testing of one or more objects) in accordance with one or more operational standards. Some materials from which the tunnels disclosed herein may be formed include alloys of aluminum or steel, as well as composites (e.g., metal matrix composites). Additionally, tunnels may be formed with a combination of rigid and flexible components, including rigid frames of aluminum, steel or other metals, and flexible skins or enclosures of plastics, rubbers, or other like materials. The wind tunnels disclosed herein must be strong enough to support various pieces of machinery or equipment (e.g., motors, rotors, or turbines) or the objects to be evaluated therein, as well as the flows of gases or liquids of various densities, and at various velocities or pressures.

The operation of the tunnels of the present disclosure may be controlled or monitored either manually or automatically using one or more computerized control systems or sensors. Such control systems may determine or confirm that conditions within the tunnels are appropriate for initiating flow thereto or for conducting one or more operations therein (e.g., confirming that a speed of a tunnel is sufficiently high to enable the requisite air flow to pass over one or more objects within the tunnel), generate or receive instructions for conducting operations of the one or more sections therein (e.g., ingress sections, conditioning sections, test sections, egress sections, observation sections), which may be associated with one or more intrinsic computers or other computing machines, and may communicate with one or more extrinsic computers or other computer machines over computer networks, such as the Internet, through the sending and receiving of digital data. Such control systems may have one or more computers, servers and/or devices featuring the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. The computers and/or control systems associated with the mobile tunnels described herein may be powered from one or more onboard alternating current (AC) or direct current (DC) power sources, including but not limited to turbines, generators or alternators, as well as batteries or fuel cells, which may be provided either within a motorized vehicle configured to tow or pull a mobile tunnel, or within the mobile tunnel itself.

For example, an ingress section, conditioning section or egress section may be provided in communication with one another within a tunnel, and may include one or more computer-operated valves, louvers, vanes or other components associated with air intakes, flow straighteners or other features for enabling or securing the flow of one or more fluids at desired pressures or velocities. Such components may include one or more actuators for raising, lowering, swinging, pivoting, opening or closing such valves, louvers, vanes or components, thereby providing or inhibiting access to one or more flow paths or passages within the tunnel, and at one or more pressures or velocities. For example, when a velocity of the tunnel exceeds a predetermined threshold (e.g., at least sixty miles per hour), one or more valves may be opened to cause the flow of fluids to enter the tunnel through at least one ingress opening. Additionally, such components may be computer-controlled and/or specifically configured to throttle or otherwise manipulate the flow of one or more fluids through a tunnel for the operational testing of an object, e.g., by matching a mass ratio, a Froude number or a Reynolds number to that of a predetermined environment, in order to simulate the flow conditions that may be expected to be encountered by the object during normal operations.

Additionally, a test section may include a number of sensors monitoring conditions within the tunnel or a status of the object itself, e.g., pitot tubes, pressure sensors, humistors, or the like, as well as one or more imaging devices (e.g., digital cameras configured to capture still or moving images within the tunnel). Likewise, an observation section may include one or more computer devices for monitoring the statuses or positions of the valves, louvers, or components, as well as the outputs of such sensors, and recording any information or data regarding the wind tunnel or any objects therein.

Although some of the embodiments disclosed herein include wind tunnels, e.g., tunnels configured or designed to receive, accommodate and discharge the flow of air or other gases, those of ordinary skill in the pertinent arts will recognize that the present disclosure is not so limited, and that tunnels for accommodating fluids of any type or form (e.g., water or other liquids), or of any pressure, velocity, density or viscosity, may be utilized in accordance with the present disclosure.

Figure 2:
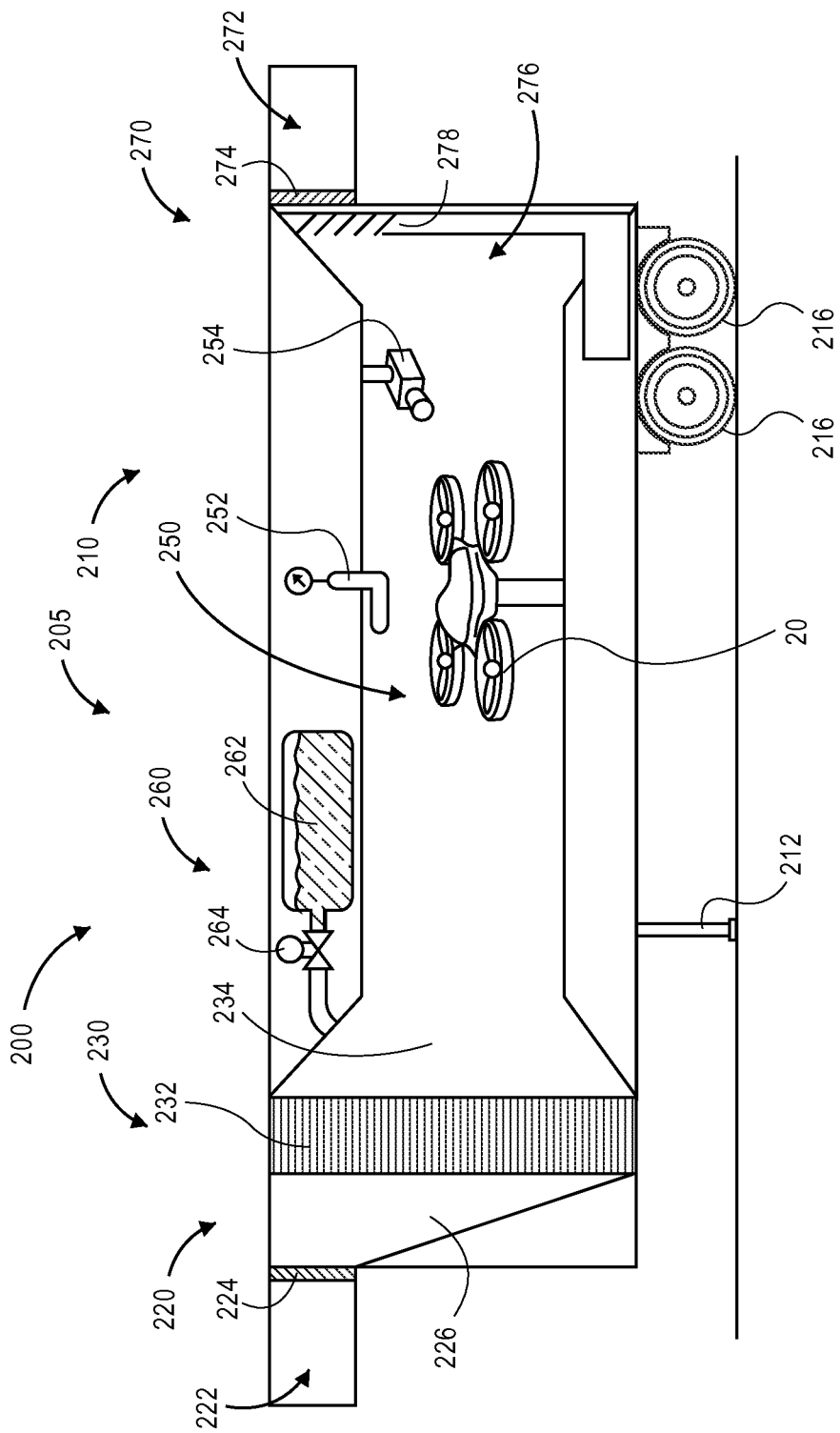
FIG. 2 is a view of one embodiment of a system including a mobile tunnel, in accordance with embodiments of the present disclosure.

Referring to FIG. 2, a view of one embodiment of a system 200 including a mobile tunnel 205 in accordance with embodiments of the present disclosure is shown. Except where otherwise noted, reference numerals preceded by the number "2" shown in FIG. 2 indicate components or features that are similar to components or features having reference numerals preceded by the number "1" shown in FIG. 1A or FIG. 1B.

As is shown in FIG. 2, the mobile tunnel 205 includes a trailer 210 having landing gear 212 and a plurality of wheels 216 and an object 20 (e.g., a UAV, or drone) for testing provided therein. The trailer 210 further includes an ingress section 220, a conditioning section 230, a test section 250, a materials injection section 260 and an egress section 270. The ingress section 220 includes an air intake 222, an intake valve 224, and an expansion section 226. The air intake 222 may be any opening extending from an exterior of the mobile tunnel 205 to an interior of the mobile tunnel 205. The intake valve 224 may be any type of louver, flap or other adjustable opening extending between the air intake 222 and the expansion section 226, which acts to diffuse the incoming airflow, e.g., by slowing its velocity and alleviating any turbulence therein. The ingress section 220 may further include one or more vanes, guides or other features (not shown) for redirecting or guiding the airflow entering the mobile tunnel 205.

Airflow entering the mobile tunnel 205 by way of the ingress section 220 next passes into the conditioning section 230, which may include one or more flow conditioning elements, such as a bank 232 of flow separators in the form of a parallel tubes or commonly aligned panels that may be provided in any arrangement or configuration. In some embodiments, the bank 232 of flow separators is provided in a honeycomb arrangement for guiding airflow therethrough in parallel paths. The conditioning section 230 further includes a contraction region 234 that narrows in cross-sectional area with respect to the bank 232 of flow separators and causes the airflow to accelerate in velocity prior to entering the test section 250.

The test section 250 includes the object 20 (e.g., the UAV) that is to be subjected to one or more testing operations and one or more sensors, including a pitot tube 252 and an imaging device 254. The object 20 may be aligned within the test section 250 in any manner with respect to the airflow entering therein. For example, as is shown in FIG. 2, the object 20 may be aligned parallel and opposite to the airflow. Alternatively, the object 20 may be manually or automatically rotated about any axis to cause the flow of air to strike and pass over the object 20 at an angle other than parallel and opposite to the airflow. The pitot tube 252 is provided to determine a velocity of the airflow within the test section 250 based at least in part on a difference in pressure between a static pressure and a stagnation (e.g., total) pressure within the test section 250. The imaging device 252 is provided to capture imaging data regarding the object 20 and any testing evolutions that may be performed on the object 20 within the test section 250.

After the airflow passes above, below or around the object 20, the airflow enters the egress section 270, which includes an air outlet 272, an outlet valve 274, an expansion section 276, and a debris catch system 278. The air outlet 272, like the air intake 222, may be any opening extending between an interior of the mobile tunnel 205 and an exterior of the mobile tunnel 205. The outlet valve 274 may include any type of louver, flap or other adjustable opening extending between the air outlet 272 and the expansion section 276, which acts to diffuse the airflow after passing above, below or around the object 20, e.g., by slowing its velocity and alleviating any turbulence therein. Like the ingress section 220, the egress section 270 may further include one or more vanes, guides or other features (not shown) for redirecting or guiding the airflow exiting the mobile tunnel 205. The debris catch system 278 may include one or more sets of screens, filters or traps which cause the materials to fall out of the airflow and into a tank or other holding system, e.g., by gravity. Alternatively, those of ordinary skill in the pertinent art will recognize that the debris catch system 278 may include or incorporate an apparatus such as a cyclonic separator that is provided to remove particulate or liquid matter from the airflow in one or more rotating vortices, by way of gravity. Subsequently, the debris catch system 278 may be emptied, and the materials therein discarded, or returned to the materials injection system 260 and reused in the operational testing of one or more other objects As is shown in FIG. 2, the mobile tunnel 205 further includes the materials injection section 260, which may be provided for the purpose of injecting any liquid, solid (e.g., particulate) or gaseous matter, e.g., smoke, dyes, vapors or other materials or substances, into the test section 250 in order to perform one or more destructive tests on the object 20. The materials injection section 260 includes a reservoir 262 of material and an injection valve 264, which may be manually or automatically (e.g., solenoid-operated, hydraulically-operated, air-operated) operated. The material within the reservoir 262 may be any type of matter, e.g., solids, liquids, or gases of any type or form and maintained at any temperature or pressure, such as oils, sands, or powders having particles of any size. Additionally, the material within the reservoir 262 may be selected on any basis, e.g., in accordance with one or more operational standards for the testing evolutions to be performed within the tunnel 205, or the actual conditions that may be expected to be encountered by the object 20, or on other models based on the object 20 (e.g., where the object 20 is a prototype).

For example, the contents of the reservoir 262 may be placed under pressures, such that when the injection valve 264 is opened, at least some of the contents of the reservoir 262 are injected or otherwise expelled into the airflow within the conditioning section 230, e.g., as the airflow accelerates within the contraction region 234, prior to entering the test section 250 and coming into contact with the object 20. For example, where the object 20 is an airborne vehicle intended to be flown in desert or beach areas, the reservoir 262 may be filled with sand, which may be charged into the airflow upon an actuation of the injection valve 264. Once the sand enters the airflow, the sand may subsequently bombard the object 20 at the speed of the airflow, thereby simulating the actual conditions that may be encountered by the object 20 in flight. Alternatively, the materials injection section 260 may include one or more propelling guns or like devices (not shown) for injecting debris, liquids or other gases into the airflow and, subsequently, into contact with the device.

Figure 3A:
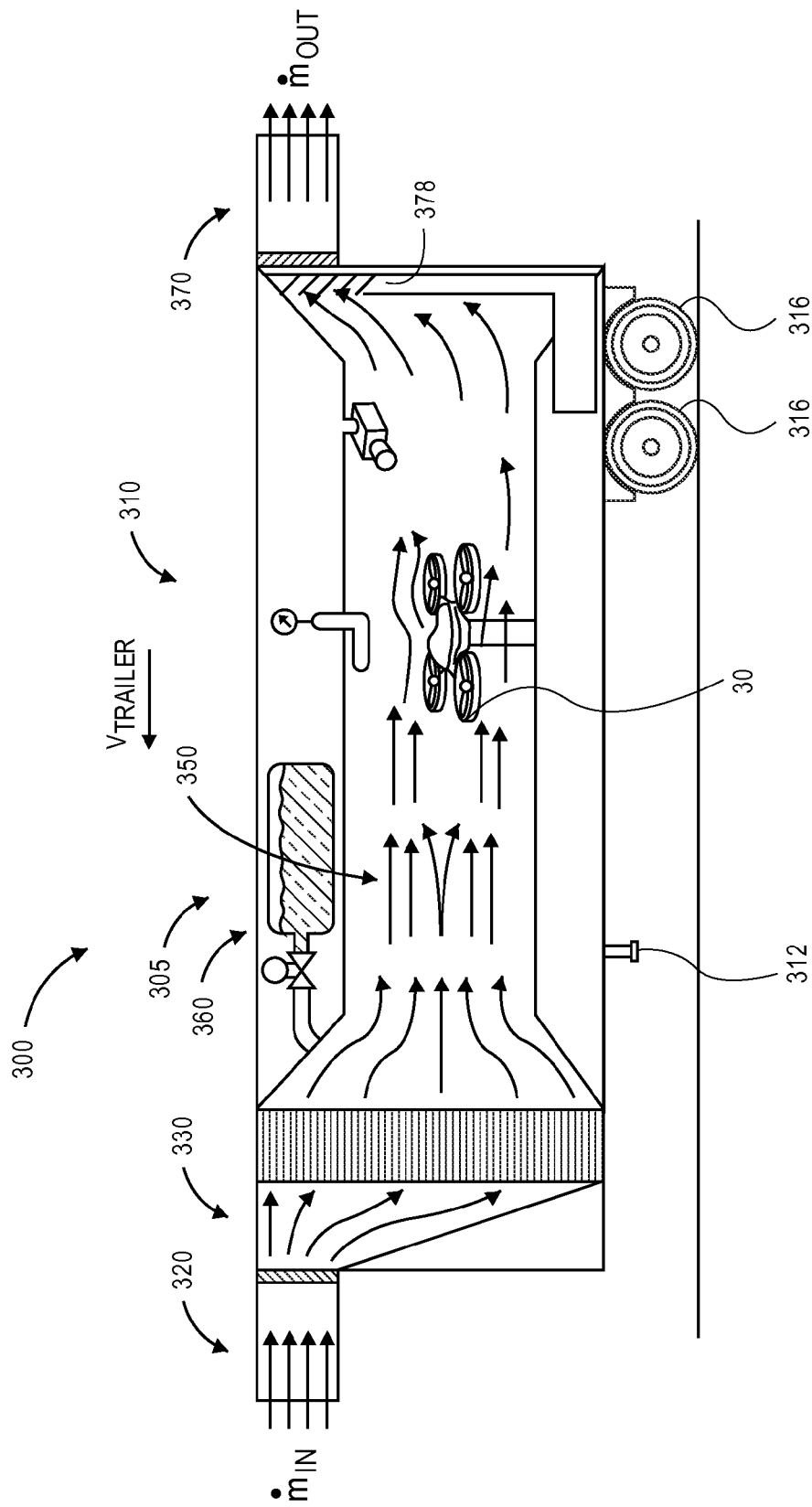
FIGS. 3A and 3B show views of embodiments of mobile tunnels, in accordance with embodiments of the present disclosure.
Figure 3B:
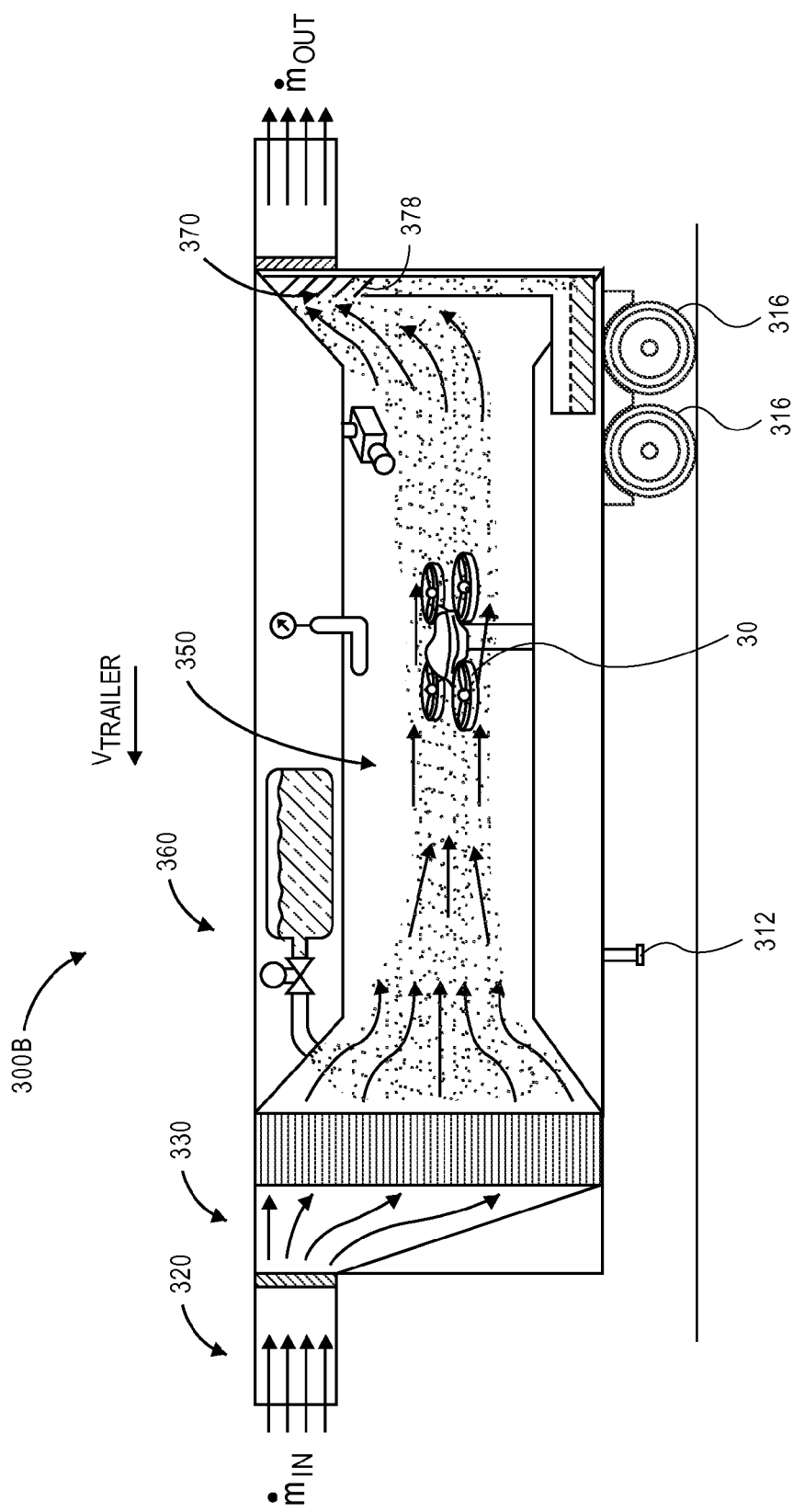

As is discussed above, the mobile tunnels of the present disclosure may be used for any type or form of operational evaluation of objects, including but not limited to aerodynamic or destructive testing of such objects. The operational evaluation may be based on the detection, tracking and analysis of airflow passing over one or more portions of the objects within various sections of a mobile tunnel that are in fluid communication with one another. Referring to FIGS. 3A and 3B, a system 300 including a mobile tunnel 305 in accordance with embodiments of the present disclosure is shown. Except where otherwise noted, reference numerals preceded by the number "3" shown in FIG. 3A or FIG. 3B indicate components or features that are similar to components or features having reference numerals preceded by the number "2" shown in FIG. 2 or by the number "1" shown in FIG. 1A or FIG. 1B.

The tunnel 305 is provided in a trailer 310 having landing gear 312 and a plurality of wheels 316, with a vehicle (e.g., a UAV or drone) 30 provided within a test section 350. Referring to FIG. 3A, the airflow into, through and out of the tunnel 305 during aerodynamic testing of the vehicle 30 as the mobile tunnel 305 travels down the roadway at a speed $V_{TRAILER}$ is shown. The airflow enters the tunnel 305 at an ingress section 320 with a mass flow rate of $m_{IN}$, and the air flow is diffused and expanded prior to passing through a conditioning section 330, which may include one or more sets of conditioning elements such as filters, screens or vanes for modifying the airflow, as necessary, within the conditioning section 330. Next, the airflow enters the test section 350, which has a substantially smaller cross-sectional area than the conditioning section 330. Within the test section 350, the airflow passes above, below and around the vehicle 30, and the effects of the airflow on the vehicle 30 may be monitored and tracked using one or more sensors and/or computer-based equipment. The vehicle 30 may be tethered or mounted inside the test section 350 or, alternatively, may be untethered, and may fly within and against the air flow passing through the test section 350

After passing above, below, and around the vehicle 30, the airflow enters an egress section 370, which has a progressively larger cross-sectional area than the test section 350. Within the egress section 370, the velocity of the airflow is reduced prior to exiting the tunnel 305, with a mass flow rate of $m_{OUT}$, which is substantially equal to the mass flow rate $m_{IN}$.

As is discussed above, tunnels may be used for performing destructive testing on one or more objects, such as by charging airflow with particles, liquids, vapors or other gases, which come into contact with the objects. Referring to FIG. 3B, the airflow into and through the tunnel 305 during destructive testing of the vehicle 30 as the mobile tunnel 305 travels down the roadway at a speed $V_{TRAILER}$ is shown. As is shown in FIG. 3B, the tunnel 305 also includes a materials injection section 360, which may be manually or automatically operated to inject materials into the airflow within the conditioning section 330 in accordance with one or more operational standards, prior to the airflow entering the test section 350, and a debris catch system 378. Once injected into the airflow, the materials travel through the test section 350 and come into contact with the vehicle 30, and the effects of the contact of the materials with the vehicle 30 may be monitored and tracked using one or more sensors and/or computer-based equipment. Prior to the airflow departing the tunnel 305, some or all of the materials injected into the airflow may be stripped and captured by way of the debris catch system 378, which may be configured to strip such materials from the airflow, e.g., by gravity.

As is discussed above, airflow may enter a mobile tunnel by way of one or more ducts, vents or intakes that may be provided in or around a vehicle and oriented to divert at least some of the air passing above, below or around the vehicle into the tunnel. Additionally, upon entering the tunnel, the airflow may be conditioned and/or boosted in velocity or pressure, in order to ensure that the airflow satisfies any prerequisites (e.g., predetermined velocities or pressures, or minimum levels of turbulence) for one or more operational tests to be performed on objects provided therein. Referring to FIGS. 4A, 4B, 4C, and 4D, views of portions of one embodiment of a system 400 including a mobile tunnel 405 in accordance with embodiments of the present disclosure are shown. Except where otherwise noted, reference numerals preceded by the number "4" shown in FIG. 4A, FIG. 4B, FIG. 4C or FIG. 4D indicate components or features that are similar to components or features having reference numerals preceded by the number "3" shown in FIG. 3A or FIG. 3B, by the number "2" shown in FIG. 2 or by the number "1" shown in FIG. 1A or FIG. 1B.

Figure 4A:
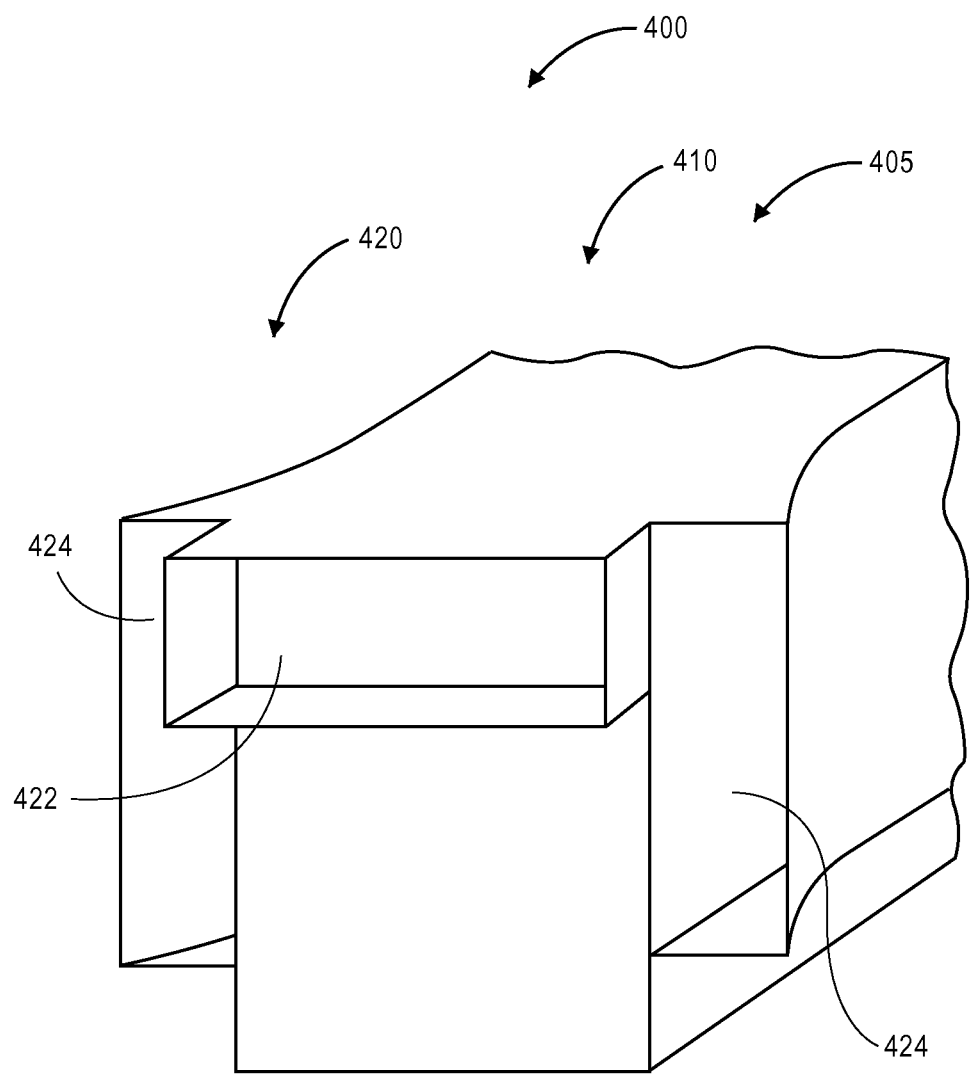
FIGS. 4A, 4B, 4C and 4D show views of portions of one embodiment of a system including a mobile tunnel, in accordance with embodiments of the present disclosure.

Referring to FIG. 4A, the tunnel 405 includes a portion of a trailer 410 housing an ingress section 420. The ingress section 420 includes a plurality of intake ducts, such as a nose intake duct 422 and a pair of side intake ducts 424. The intake ducts of the ingress section 420 may be of any size or shape, and have any dimensions, as required. Additionally, the intake ducts may be formed as one or more fairings in an external surface of the trailer 410. For example, the nose intake duct 422 may have approximately the same width as a road tractor or other vehicle (not shown) to which the trailer 410 is mounted, or may have a larger or smaller width. According to some embodiments, the nose intake duct 422 may be approximately six feet (6 ft) wide and six feet (6 ft) long. Likewise, the side intake ducts 424 may have the same height as the trailer 410, or have larger or smaller heights. According to some embodiments, the side intake ducts 424 may be approximately twenty-one inches (21", or 1.75 ft) wide, and approximately twelve feet (12 ft) long.

Figure 4B:
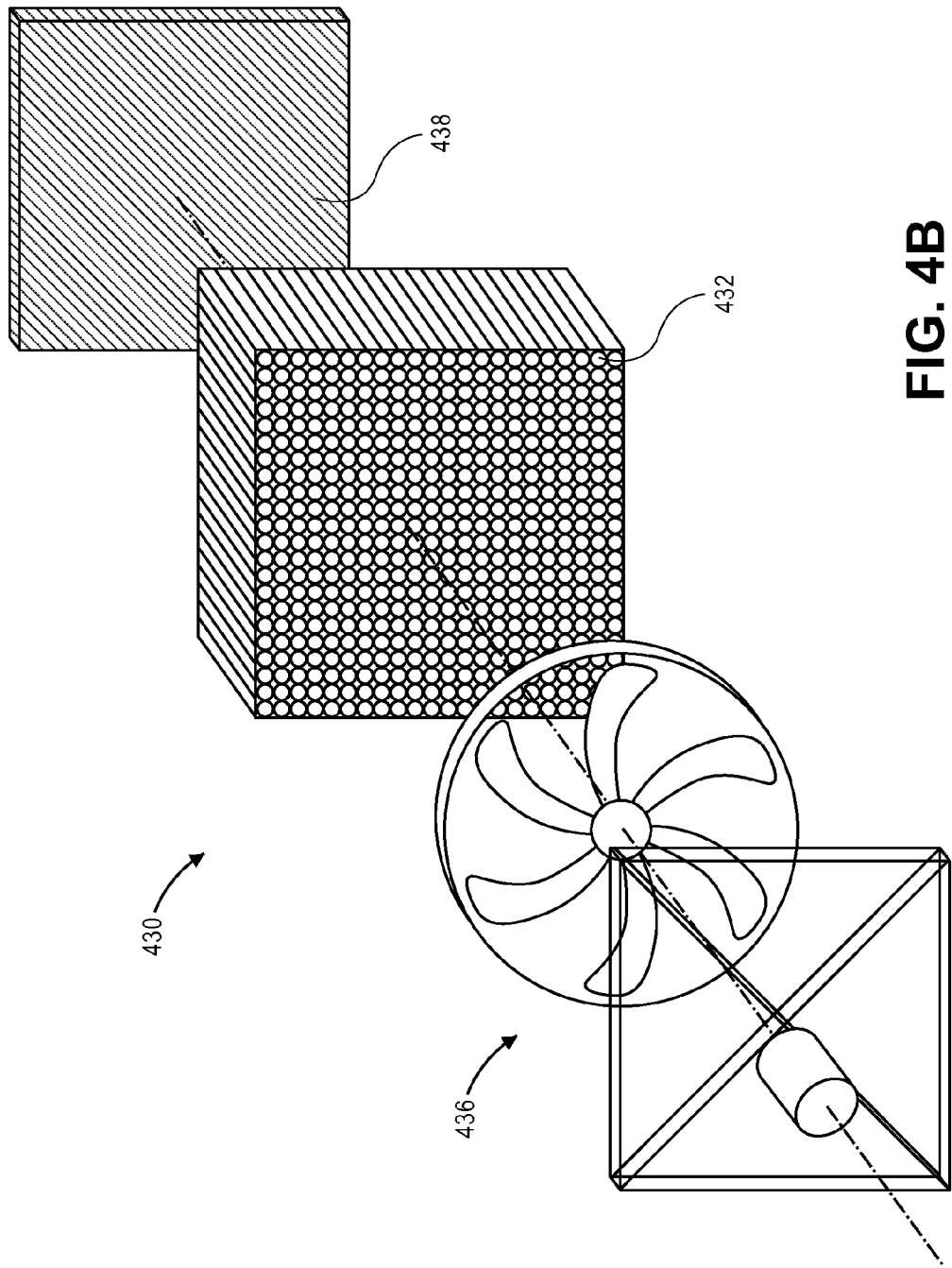

As is also discussed above, airflow entering a tunnel by way of an ingress section may then be conditioned prior to coming into contact with an object to be evaluated therein. Referring to FIG. 4B, an exploded view of portions of a conditioning section 430 of the tunnel 405 is shown. The conditioning section 430 is to be provided within the tunnel 405, aft of and in fluid communication with the ingress section 420, and includes a number of conditioning elements such as a motorized rotor 436, as well as a plurality of flow separators 432 and a filter 438 in the form of a mesh or screen. The motorized rotor 436 may increase or decrease the velocity and/or pressure of the airflow entering the tunnel 405, while the flow separators 432 may unify the airflow across a cross-section of the tunnel 405, and the filter 438 may remove or block any debris or other unwanted material within the airflow from entering the tunnel 405. Alternatively, the conditioning section 430 may include one or more heaters or chillers (not shown) for changing a temperature of the airflow, or any other components for adjusting one or more properties of the airflow.

Figure 4C:
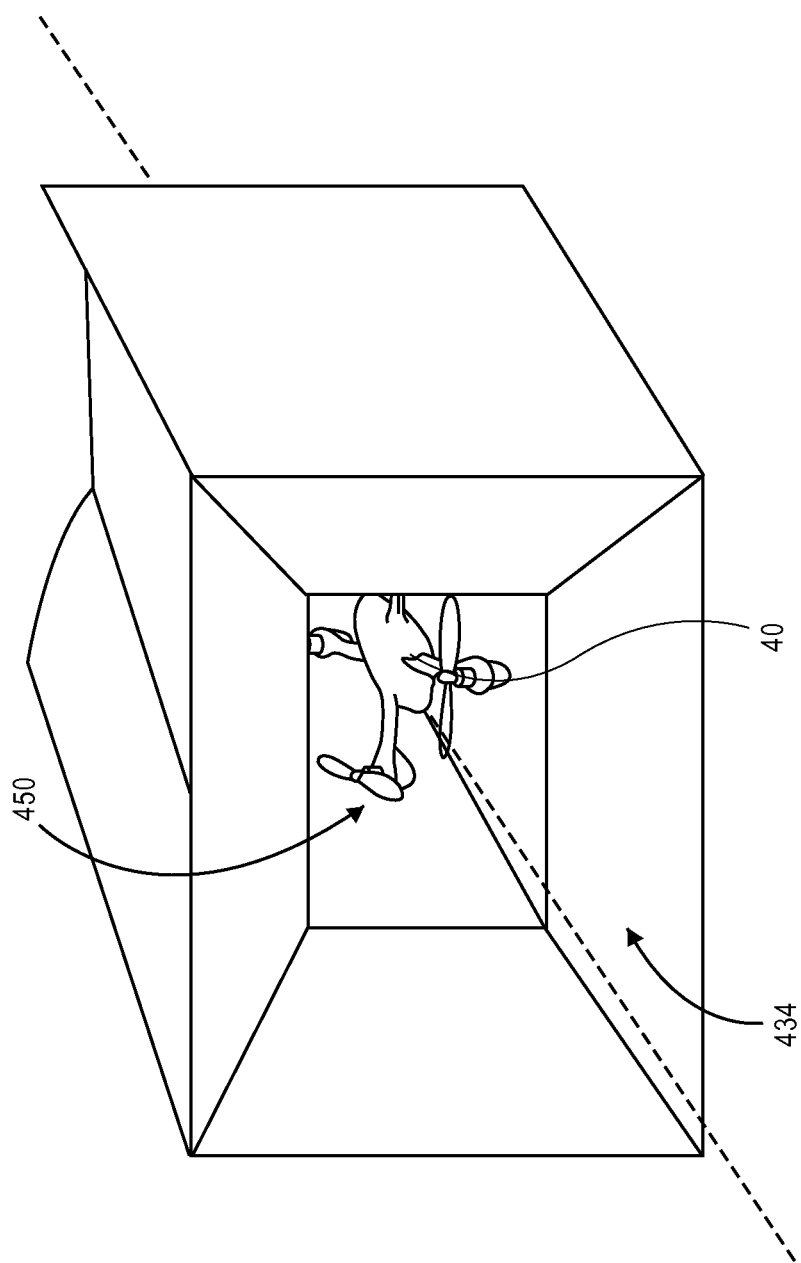

After the airflow has been conditioned, the airflow may then be accelerated to a desired velocity and permitted to come into contact with the object to be evaluated. Referring to FIG. 4C, a test section 450 of the tunnel 405 is shown with an object 40 (e.g., a UAV, or drone) therein. Airflow enters the test section 450 by way of a contraction region 434 associated with the conditioning section 430. The contraction region 434 has a tapered cross-section that causes the airflow to accelerate therein, prior to entering the test section 450 and coming into contact with the object 40.

Figure 4D:
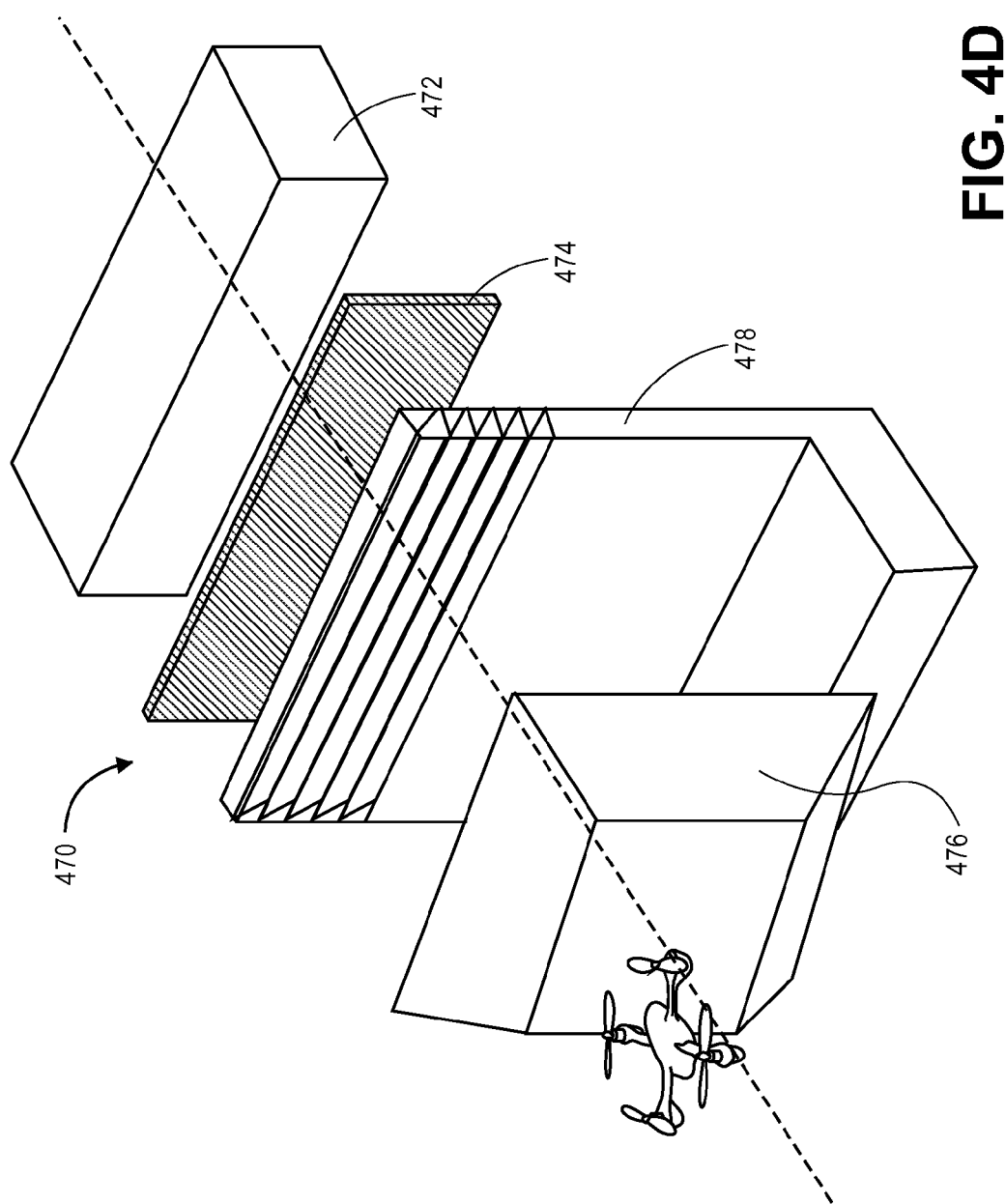

Finally, after the airflow has come into contact with and passed over the object to be evaluated, the airflow may depart the tunnel via one or more egress sections. Referring to FIG. 4D, an egress section 470 for inclusion within the vehicle 410 is shown. The egress section 470 of FIG. 4D includes an air outlet 472, an outlet valve 474, an expansion section 476, and a debris catch system 478. The air outlet 472 may include one or more air openings or channels extending to an exterior of the mobile tunnel 405, and may include one or more sub-openings or sub-channels in parallel. Additionally, the air outlet 472 may be aligned coaxially with the mobile tunnel 405, or parallel to an axis of the mobile tunnel 405, or, alternatively, at another angle with respect to the mobile tunnel 405. Moreover, the outlet valve 474 may be any type of manually or automatically operable opening, e.g., a louver, a flap or any other type of valve that may be controlled (e.g., opened, closed or throttled) in order to cause or alter a flow of air passing therethrough. The expansion section 476 may diffuse the airflow after the air has passed above, below or around the object 40, and the debris catch system 478 may include one or more sets of screens, filters or traps which cause the materials to fall out of the airflow and into a tank or other holding system, e.g., by gravity.

Those of ordinary skill in the pertinent arts will recognize that many of the components of the ingress section 420, the conditioning section 430, the test section 450 or the egress section 470 shown in FIG. 4A, 4B, 4C or 4D may be installed within the mobile tunnel 405 in a modular manner, and may be added to or removed from the mobile tunnel 405 based on the demands or parameters of a given evolution. For example, a mobile tunnel may include one or more motorized rotors 436, batteries of flow separators 436 or filters 438, contraction regions 434, expansion sections 476, outlet valves 474, debris catch systems 478, or air outlets 472 in accordance with the present disclosure.

Figure 5:
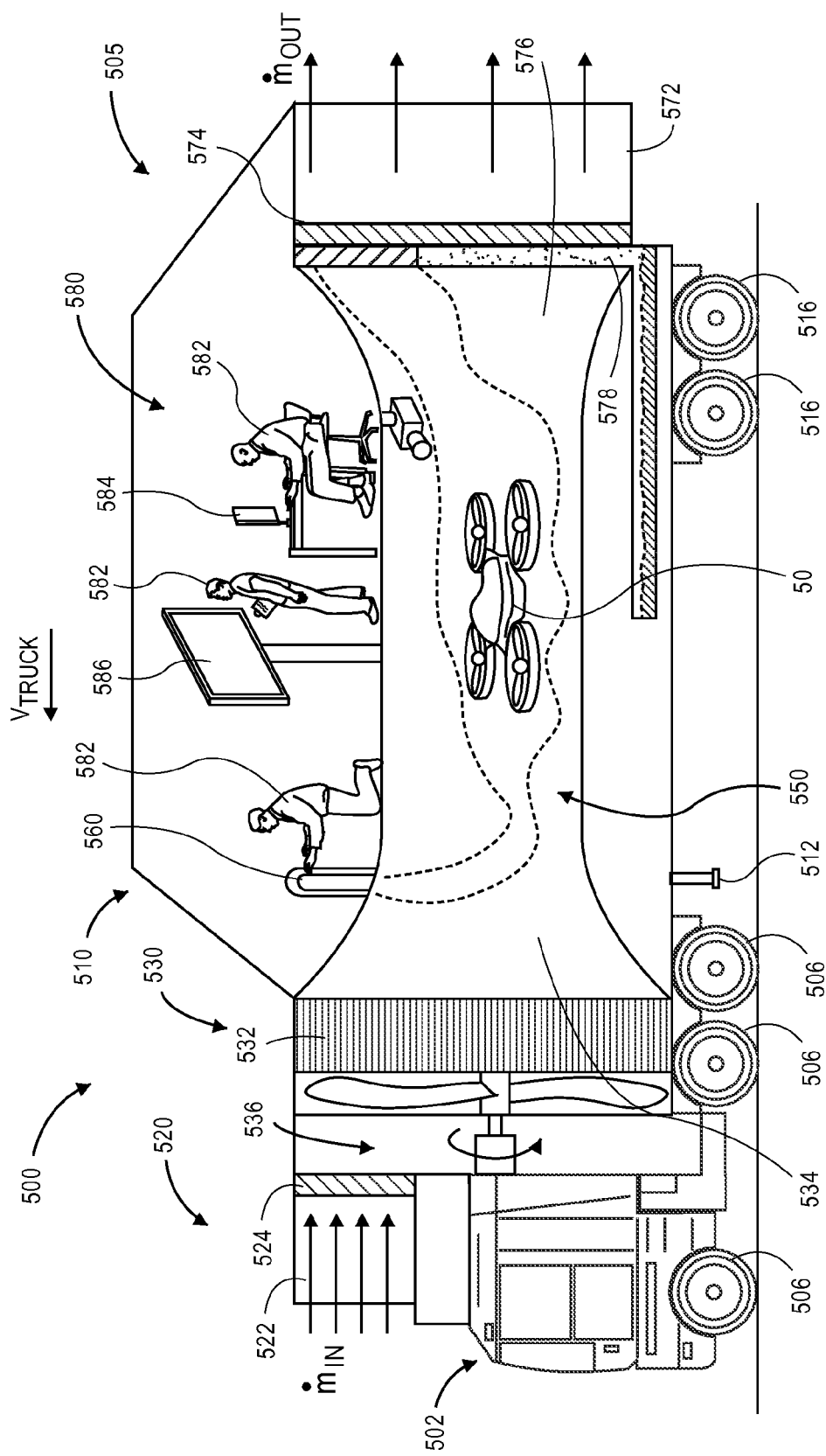
FIG. 5 shows a view of one embodiment of a system including a mobile tunnel, in accordance with embodiments of the present disclosure.

As is further discussed above, the tunnels of the present disclosure may include one or more observations sections within which designers, engineers, or testing personnel may visibly observe, conduct, or control operational testing of an object within a tunnel. Referring to FIG. 5, a view of one embodiment of a system 500 including a mobile tunnel 505 in accordance with the present disclosure is shown. Except where otherwise noted, reference numerals preceded by the number "5" shown in FIG. 5 indicate components or features that are similar to components or features having reference numerals preceded by the number "4" shown in FIG. 4A, FIG. 4B or FIG. 4C, by the number "3" shown in FIG. 3A or FIG. 3B, by the number "2" shown in FIG. 2 or by the number "1" shown in FIG. 1A or FIG. 1B.

As is shown in FIG. 5, the tunnel 505 is provided in a trailer 510 or like vehicle configured for towing by a road tractor 502. The tunnel 505 includes an ingress section 520, a conditioning section 530, a test section 550 having an object 50 therein, a material injection system 560, an egress section 570, and an observation section 580. The ingress section 520 is configured to receive air passing over the road tractor 502 when the road tractor 502 and the trailer 510 are in motion. The ingress section 520 includes an air intake 522 and an air intake valve 524, which may be a manually or automatically operated louver-type valve or other valve for opening, throttling or closing a flow of air into the tunnel 505.

The conditioning section 530 is in fluid communication with the ingress section 520 and includes a plurality of flow separators 532, a contraction region 534 and a motorized rotor 536 for conditioning the air received by way of the ingress section 520. The motorized rotor 536 may be controlled to manipulate the pressure and/or velocity of the airflow, while the flow separators 532 may blend the airflow across all or most of the cross-section of the conditioning section 530, and the contraction region 534 has a tapered shape and creates a narrowing flow path between the flow separators 532 and the test section 550. Additionally, the contraction region 534 of FIG. 5 has a rounded (e.g., parabolic) shape extending between the flow separators 532 and the test section 550. The rounded shape of the contraction region 534 increases the likelihood that air arriving in the test section 550 will have a smooth boundary layer as the air passes over the object 50 therein.

As is shown in FIG. 5, the test section 550 is in fluid communication with the conditioning section 530 and includes the object 50 (e.g., a UAV, or drone) to be subjected to aerodynamic and/or destructive testing therein. The egress section 570 is in fluid communication with the test section 550 and includes an air outlet 572, an air outlet valve 574 and an expansion section 576 in which the airflow is diffused after passing above, over and around the object 50. The egress section 570 further includes a debris catch system 578 that may remove one or more solids or liquids from the diffused airflow prior to departing the tunnel 505 by way of the air outlet 572. The air outlet 572 extends for all or most of the height of the egress section 570 following the expansion section 576. Those of ordinary skill in the pertinent arts will recognize that an egress section 570 and/or the one or more air outlets 572 may have any dimension (e.g., height, width or length), and may include or cover all or a portion of a rear, side, top or bottom face or surface of a tunnel 505 in accordance with the present disclosure.

As is also shown in FIG. 5, the vehicle 510 includes an observation section 580 mounted above the test section 550 in which the various testing operations (e.g., aerodynamic testing and/or destructive testing) performed within the test section 550 may be observed, conducted or controlled by one or more personnel 582. Within the observation section 580, the personnel 582 may operate one or more computer devices 584, view information or data (e.g., imaging data, such as real-time or near-real time video, as well as results or status information) regarding the one or more operations being conducted within the test section 550 on a display monitor 586, or operate the material injection system 560, which may be used to inject smoke or other fine matter into the tunnel 505 in order to aid in viewing airflow and air behavior above, below and around the object 50, as well as particles or liquids for conducting destructive testing of the object 50. Additionally, the observation section 580 may include one or more sliding or roll-away openings (not shown), such as doors or windows, which enable the personnel 582 within the observation section 580 to view the operations being conducted within the test section 550 as they occur.

The vehicle 510 may be formed from a sufficiently strong frame that may support the object 50 and any equipment therein, e.g., the flow separators 532, the contraction region 534 or the motorized rotor 536 of the conditioning section 530, as well as the object 50 within the test section 550, and withstand any forces or pressures associated with the operational testing being performed on the object, while providing support for the observation station 580, the personnel 582, the computer 584, the display monitor 586 and any other personnel or equipment provided therein.

Although the observation section 580 is shown in an upper portion of the trailer 510, above the test section 550, observation sections may be provided in any portion of a tunnel, and may include any number of personnel, as well as any type of computers or other equipment for observing, conducting or controlling operational testing being performed within the tunnel 505. Moreover, such observation sections may have any shape, e.g., a shape selected in order to enhance the aerodynamic efficiency (e.g., limit drag) of the tunnel 505. Additionally, the computers within the observation section 530, such as the computer 584, may be in communication with one or more other external computer devices over one or more computer networks, such as the Internet, through the sending and receiving of digital data.

Figure 6:
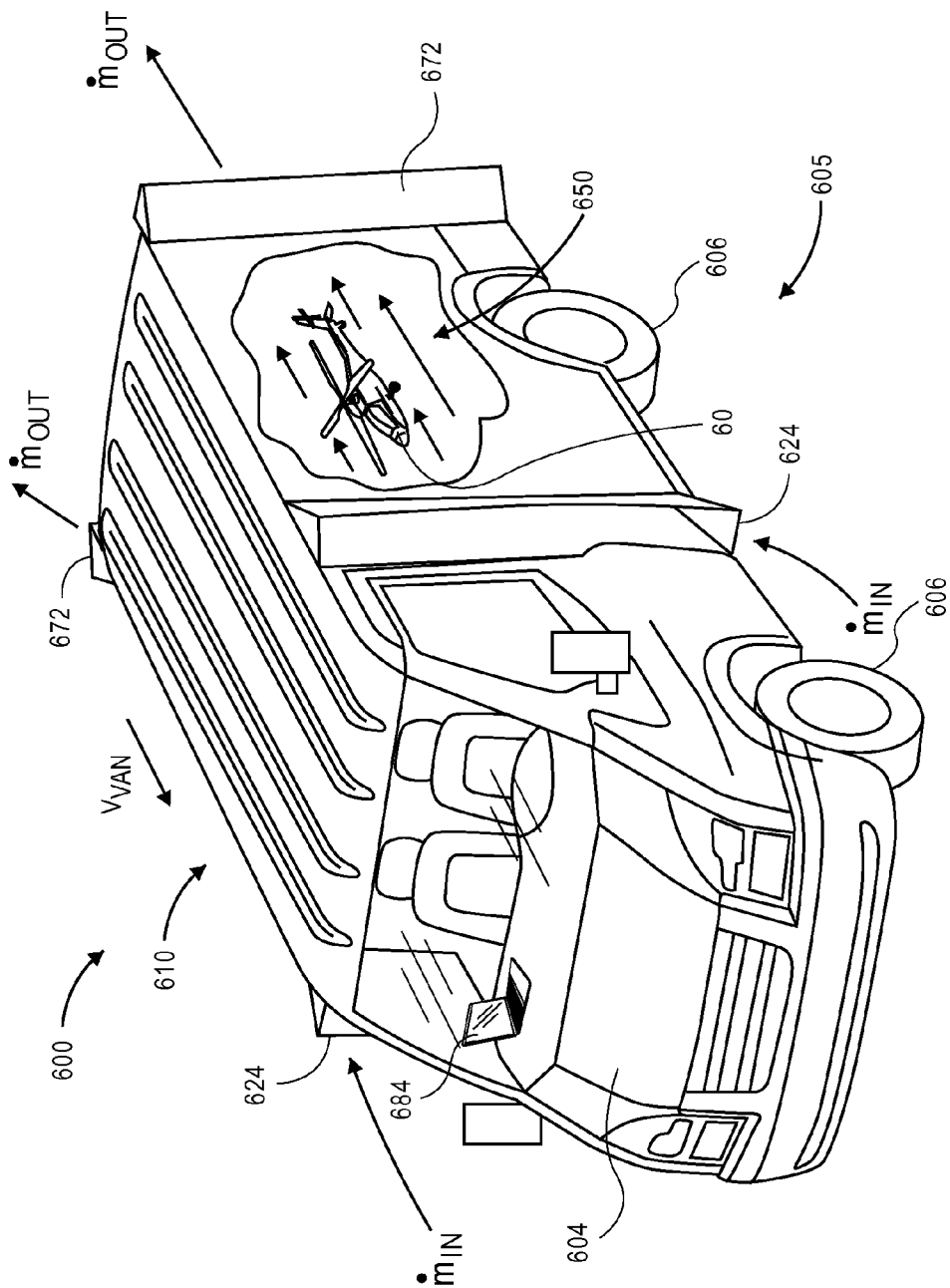
FIG. 6 shows a view of one embodiment of a system including a mobile tunnel, in accordance with embodiments of the present disclosure.

The tunnels disclosed herein may be provided within or as portions of any type or size of vehicle. Referring to FIG. 6, a view of one embodiment of a system 600 including a mobile tunnel 605 in accordance with embodiments of the present disclosure is shown. Except where otherwise noted, reference numerals preceded by the number "6" shown in FIG. 6 indicate components or features that are similar to components or features having reference numerals preceded by the number "5" shown in FIG. 5, by the number "4" shown in FIG. 4A, FIG. 4B or FIG. 4C, by the number "3" shown in FIG. 3A or FIG. 3B, by the number "2" shown in FIG. 2 or by the number "1" shown in FIG. 1A or FIG. 1B.

As is shown in FIG. 6, the tunnel 605 is provided in a van 610 or truck, such as a cargo van, a minivan, or a delivery truck. The van 610 is configured for operation on one or more roadways or other like surfaces, and includes an engine 604 and a plurality of tires 606. The van 610 further includes a plurality of air intakes 622 provided alongside the van 610, at a forward portion thereof, as well as a test section 650 having an object 60 (e.g., a UAV, or drone) within a cargo hold of the van 610, and a plurality of air outlets 672 provided alongside the van 610, at an aft portion thereof.

As the van 610 travels down the roadway at a speed $V_{VAN}$, air may enter the tunnel 605 by way of the air intakes 622 at a mass flow rate of $m_{IN}$. The air may be throttled, manipulated, or otherwise conditioned before being redirected within the cargo hold of the van 610 to pass above, below and around the object 60, and depart the tunnel 605 by way of the air outlets 672 at a mass flow rate of $M_{OUT}$, which is substantially equivalent to $m_{IN}$. Additionally, one or more personnel may operate the van 610 from a cab thereof, and may observe, conduct or control operational testing being performed within the tunnel 605 using one or more computers 684. The van 610 may include any type of physical barrier or separator (not shown) between the cab and the cargo hold, thereby enabling any type or form of aerodynamic or destructive testing to be performed without adversely affecting any operators therein, or otherwise subjecting the operators to the conditions within the test section 650.

Figure 7A:
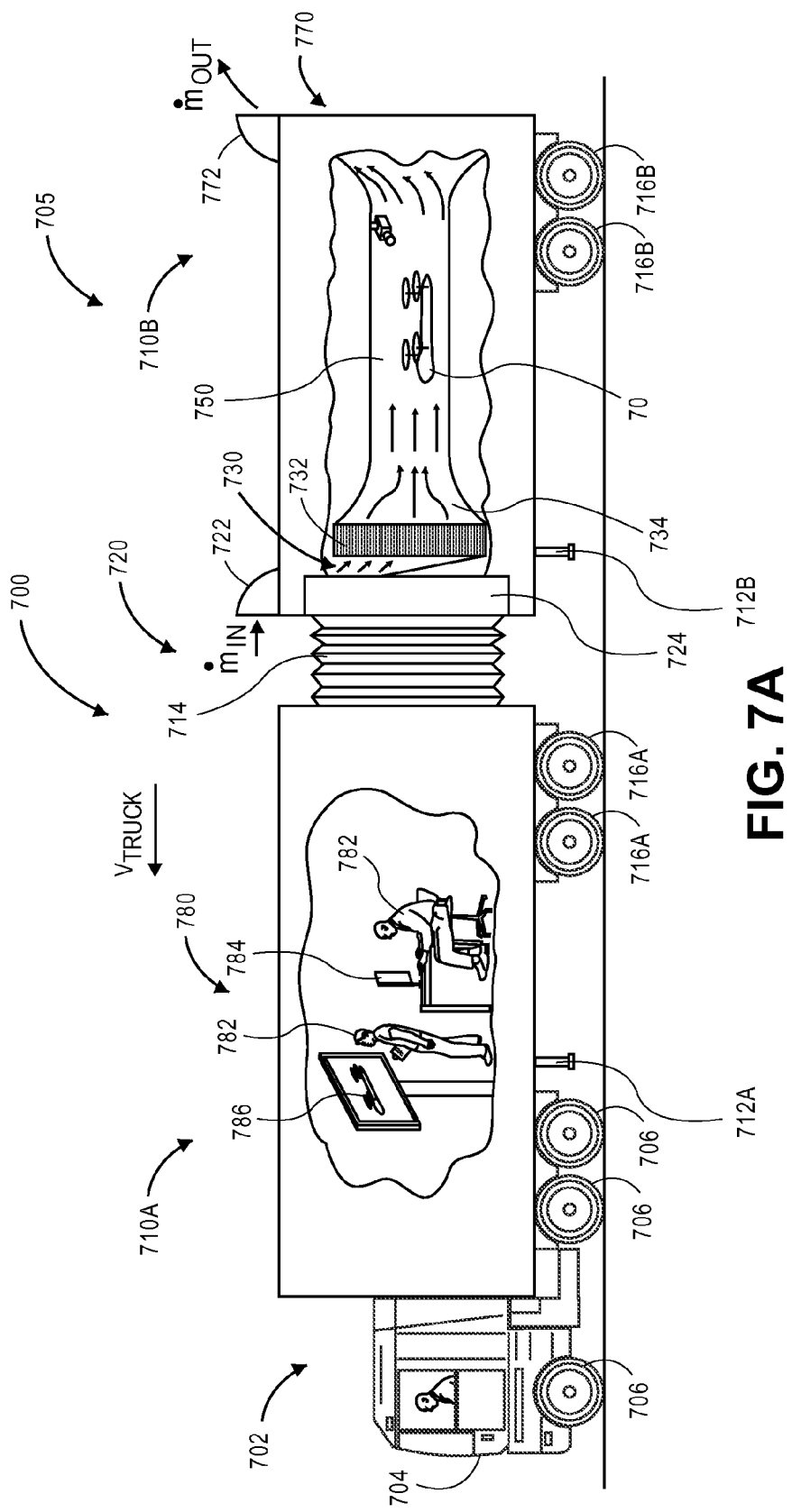
FIGS. 7A and 7B show views of embodiments of systems including a mobile tunnel, in accordance with embodiments of the present disclosure.
Figure 7B:
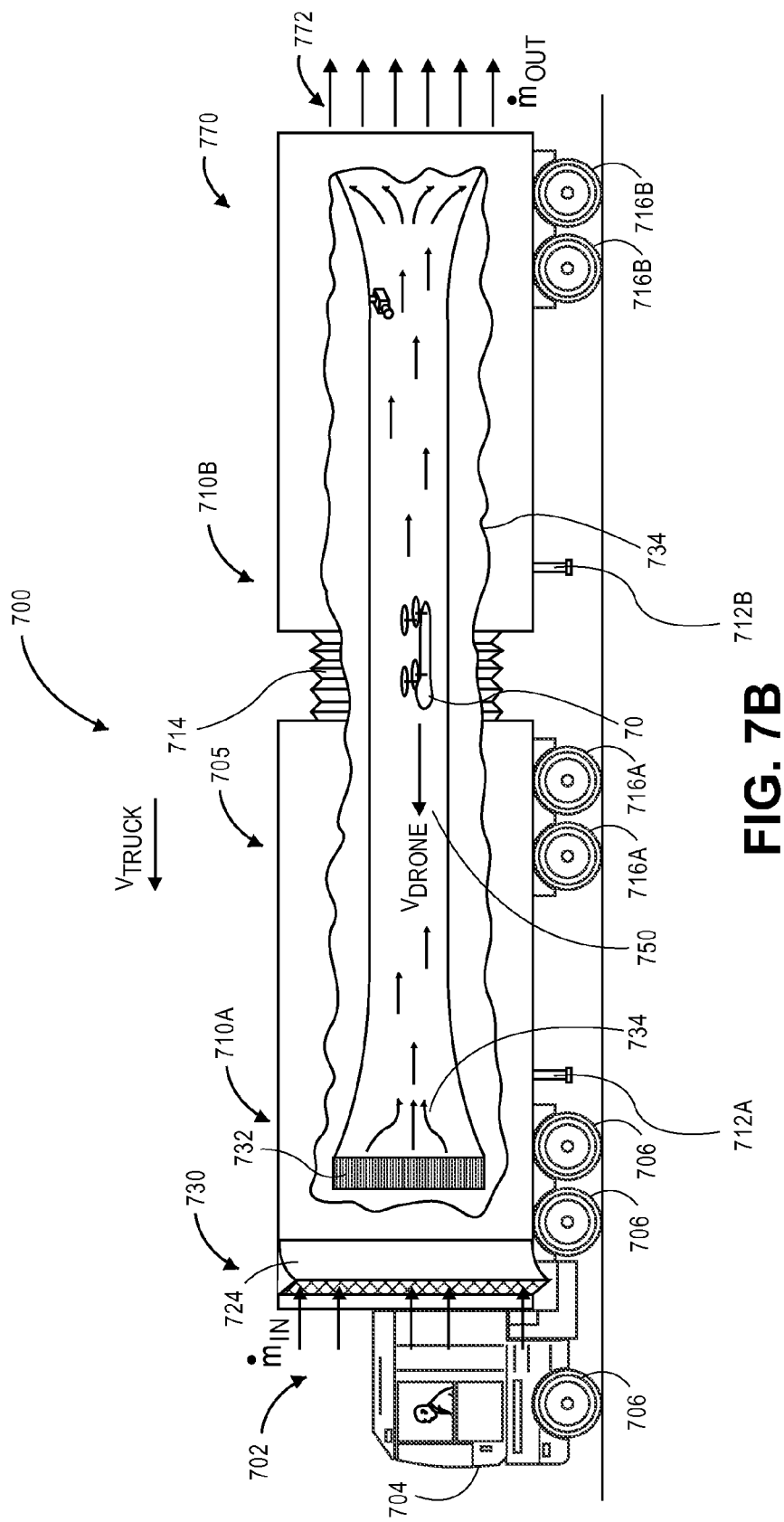

Additionally, the tunnels of the present disclosure may be provided in one or more discrete vehicles having components that may be joined or substituted for one another in any desired sequence in a modular manner. Referring to FIG. 7A and FIG. 7B, views of embodiments of a system 700 including mobile tunnels 705 in accordance with the present disclosure is shown. Except where otherwise noted, reference numerals preceded by the number "7" shown in FIG. 7A or FIG. 7B indicate components or features that are similar to components or features having reference numerals preceded by the number "6" shown in FIG. 6, by the number "5" shown in FIG. 5, by the number "4" shown in FIG. 4A, FIG. 4B or FIG. 4C, by the number "3" shown in FIG. 3A or FIG. 3B, by the number "2" shown in FIG. 2 or by the number "1" shown in FIG. 1A or FIG. 1B.

As is shown in FIG. 7A, the system 700 includes a road tractor 702, a forward vehicle 710A and an aft vehicle 710B. The road tractor 702 includes a motor 704 and a plurality of wheels 706. The forward vehicle 710A is joined to the aft vehicle 710B by a flexible articulator 714.

The tunnel 705 is provided in the aft vehicle 710B, which also includes landing gear 712B and a plurality of wheels 716B. The tunnel 705 includes an ingress section 720, a conditioning section 730, a test section 750 having an object 70 (e.g., a UAV, or drone) to be tested therein, and an egress section 770. The ingress section 720 includes an air intake 722 provided at an upper portion of the aft vehicle 710B, and air intakes 724 provided alongside a forward portion of the aft vehicle 710B, with the air intakes 722, 724 aligned to receive air therein when the aft vehicle 710B is in motion. The egress section 770 also includes an air outlet 772 provided at an upper portion of the aft vehicle 710B, and is aligned to expel air from the tunnel 705. The conditioning section 730 includes a plurality of flow separators 732 and a contracting region 734 for increasing the velocity and/or pressure of the airflow prior to the test section 750.

Additionally, the forward vehicle 710A further includes an observation section 780 therein. Within the observation section 780, a plurality of personnel 782 may operate one or more computer devices 784, view information or data regarding operations being conducted within the test section 750 on display monitors 786, or operate a material injection system (not shown) to inject smoke or other fine matter into the tunnel 705.

Those of ordinary skill in the pertinent arts will recognize that mobile tunnels may be provided in series with any number or type of vehicles in accordance with the present disclosure, and need not be provided in an aft vehicle, or in one of a pair of vehicles in tandem with one another. Moreover, one or more of the portions of a tunnel may be provided in separate vehicles and joined together, e.g., by passing airflow through a connecting section or articulator. As is shown in FIG. 7B, the system 700 includes the road tractor 702, the forward vehicle 710A and the aft vehicle 710B, with the forward vehicle 710A and the aft vehicle 710B joined by the flexible articulator 714. The tunnel 705 is provided in the forward vehicle 710A, the aft vehicle 710B and the flexible articulator 714, with the object 70 provided therein. The object 70 is untethered, such that the object 70 may fly within the tunnel 705 in a self-powered manner, e.g., at a velocity $V_{DRONE}$, independent of any contact with the tunnel 705. Therefore, by providing multiple vehicles in a modular manner, and in series, a tunnel of any length may be formed, and the dimensions of the tunnel may be defined based on one or more dimensions of the respective vehicles and/or connectors thereof.

Figure 8:
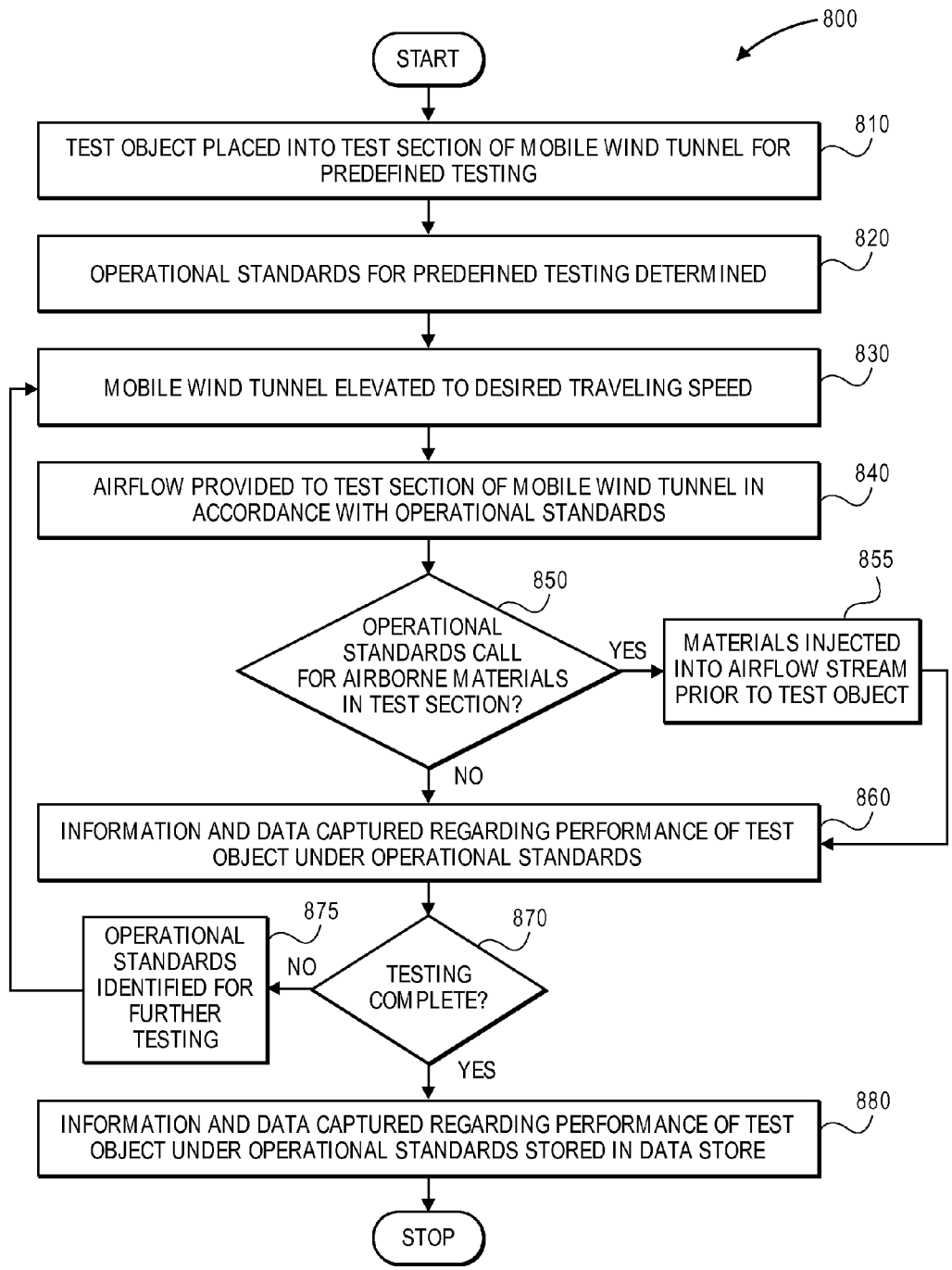
FIG. 8 shows a flow chart of one operational testing process that may be performed using systems including mobile tunnels in accordance with embodiments of the present disclosure.

As is discussed above, the mobile tunnels of the present disclosure may be utilized to perform any type or form of operational testing (e.g., aerodynamic testing or destructive testing) in accordance with predetermined operational standards such as velocity, pressure, temperature, or duration limits or thresholds. Referring to FIG. 8, a flow chart 800 of one operational testing process that may be performed using systems including mobile tunnels in accordance with embodiments of the present disclosure is shown.

At box 810, a test object is placed into a test section of a mobile tunnel for the performance of a predefined testing procedure. The test object may be any type of object for which aerodynamic and/or destructive testing is desired, such as a small aircraft (e.g., a UAV) or structure (e.g., one or more portions of a modular home or a temporary building such as a Quonset hut). At box 820, operational standards for the predefined testing procedure are determined. For example, aerodynamic testing may require flows of air or other gases at previously established velocities, pressures, temperatures, or densities, while destructive testing may call for the injection of a specific homogenous or heterogeneous material into such flows.

At box 830, the mobile tunnel is adjusted to a desired traveling speed. The mobile tunnel may be accelerated or decelerated in any manner. For example, referring to FIG. 2, the tunnel 205 may be provided in the vehicle 210 that may be towed by the road tractor 202 at a desired speed, thereby causing the tunnel 205 provided in the vehicle 210 to also travel at the desired speed. At box 840, airflow is provided to the test section of the tunnel in accordance with the operational standards determined at box 820. For example, referring again to FIG. 2, airflow may enter the tunnel 205 at the air intake 222, pass through the conditioning section 230 and, subsequently, above, below and around the object 20 before departing the tunnel 205 at the air outlet 272.

At box 850, if the operational standards call for airborne materials within the test section, then the process advances to box 855, where materials are injected into the airflow stream prior to the test object in accordance with the operational standards. For example, referring again to FIG. 3B, the materials injection system 360 may inject solids, liquids, gases or other materials into the airflow within the conditioning section 330, such that the air and the materials come into contact with the vehicle 30 in the test section 350. If the operational standards do not call for airborne materials within the test section, e.g., as is shown in FIG. 3A, or after such materials are injected therein, then the process advances to box 860, where information and data is captured regarding the performance of the test object under the operational standards. For example, referring again to FIG. 5, one or more personnel 582 may observe, conduct or control the one or more testing operations within the test section 550 using one or more computers 584 or display monitors 584.

At box 870, whether the testing is complete is determined. If the testing is not complete, then the process advances to box 875, where operational standards for further testing are identified. For example, additional tests may call for airflows at higher or lower velocities, or higher or lower pressures, or for different materials to be injected into such airflows. After the operational standards for the further testing are identified, the process returns to box 830, where the mobile wind tunnel is adjusted to a desired traveling speed, as necessary, and to box 840, where airflow is provided to the test section of the tunnel in accordance with the newly identified operational standards. If no additional testing is required, however, then the process advances to box 880, where the information or data captured regarding the performance of the test object under the operational standards is stored in a data store, which may be a local or remote server, database or other data storage system, or a virtual cloud-based storage system, and the process ends.

Figure 9:
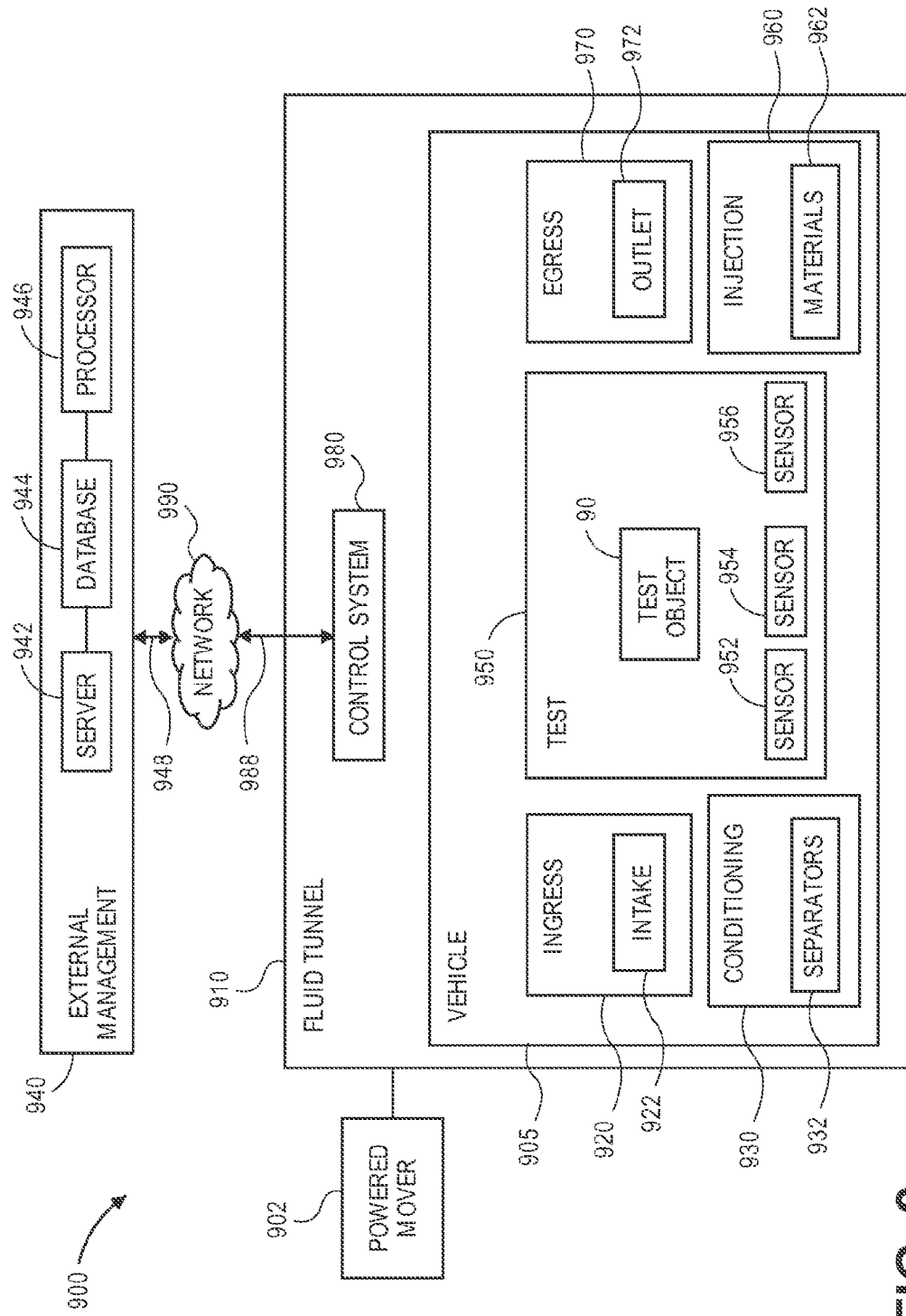
FIG. 9 shows a block diagram of components of one system including a mobile tunnel, in accordance with embodiments of the present disclosure.

As is discussed above, the operation of the mobile tunnels disclosed herein may be controlled or monitored either manually or automatically using one or more computerized control systems or sensors. Referring to FIG. 9, a block diagram of components of one system 900 including a fluid tunnel 910, in accordance with embodiments of the present disclosure. Except where otherwise noted, reference numerals preceded by the number "9" shown in FIG. 9 indicate components or features that are similar to components or features having reference numerals preceded by the number "7" shown in FIG. 7A or FIG. 7B, by the number "6" shown in FIG. 6, by the number "5" shown in FIG. 5, by the number "4" shown in FIG. 4A, FIG. 4B or FIG. 4C, by the number "3" shown in FIG. 3A or FIG. 3B, by the number "2" shown in FIG. 2 or by the number "1" shown in FIG. 1A or FIG. 1B.

As is shown in FIG. 9, the system 900 includes the fluid tunnel 910 and an external management system 940. The fluid tunnel 910 may be associated with a powered mover 902 and may include a vehicle 905. The powered mover 902 may be any type or form of device or machine for causing the vehicle 905 and/or the fluid tunnel 910 to be placed in motion at a desired velocity, including but not limited to another vehicle, such as any type or form of automobile, tractor, train or truck, or any other aircraft, land craft or sea craft. Alternatively, the powered mover 902 and the vehicle 905 and/or wind tunnel 910 may be provided in a common unit, such as the van 610 of FIG. 6. Within or associated with the vehicle 905, one or more of an ingress section 920, a conditioning section 930, a test section 950, an injection system 960 and an egress section 970 may be included.

The ingress section 920 includes one or more intake valves 922 or other manually or automatically operable components for causing air or other fluids to enter the fluid tunnel 910 from an exterior. The intake valve 922 may, for example, include one or more openings for initiating, throttling, or securing flow through the fluid tunnel 910. Additionally, the ingress section 920 may also include one or more sensors or other monitors for automatically determining or adjusting the positions of the intake valve 922 or one or more other components thereof.

The conditioning section 930 includes one or more static or dynamic components such as flow separators 932 for conditioning flow received from an exterior of the fluid tunnel 910, e.g., via the ingress section 920, prior to transferring at least some of the flow to a test section 950. Additionally, the test section 950 may have one or more test objects 90, such as the object 70 (e.g., a UAV or drone) of FIG. 7A or FIG. 7B, or any other object for which operational or destructive testing may be desired or required, along with one or more sensors 952, 954, 956, provided therein. The sensors 952, 954, 956 may include, but are not limited to, one or more pitot tubes, anemometers or pressure sensors, as well as imaging devices, for capturing information or data regarding the test object 90 and the conditions within the test section 950. The sensors 952, 954, 956 may be in communication with a control system 980 within or associated with the fluid tunnel 910, or to one or more external computing devices over a network 990.

The injection system 960 may be aligned within or along a flow path extending between the ingress section 920 and the egress section 970, and may be configured to inject any type or form of materials 962 into the flow of a fluid therein. For example, the injection system 960 may be configured to inject any type or form of solids, liquids, or gases into the flow of fluid, including smoke, dyes, vapors or any other materials or substances. The injection system 960 may further include any manually or automatically operated valves or other components for causing the materials to be injected into the flow of the fluid, prior to or within the test section 950.

The control system 980 may control any aspect of the operation of the vehicle 905 and/or the fluid tunnel 910, including but not limited to the intake 922, the sensors 952, 954, 956, the injection system 960 or the outlet 972. For example, the control system 980 may operate one or more valves or controllers to initiate, throttle or secure the flow of one or more fluids and any associated materials (e.g., the materials 962) between the ingress section 920 and the egress section 970, and over or around the object 90 therein. Additionally, the control system 980 may transmit or receive one or more instructions or commands for controlling the operation of such valves or other controllers to initiate, throttle or secure such flow.

The control system 980 may be provided as a freestanding system accessible to the fluid tunnel 910 over the network 990. Alternatively, the control system 980 may be further provided in connection with one or more other components of the system 900 of FIG. 9, such as the external management system 940. The control system 980 may include one or more computers, servers and/or devices featuring the necessary electronics, software, memory, storage, databases, firmware, logic/state machines, microprocessors, communication links, displays or other visual or audio user interfaces, printing devices, and any other input/output interfaces to provide any of the functions or services regarding the operation of any one of the ingress section 920, the conditioning section 930, the test section 950, the injection system 960 or the egress section 970, or the various sensors 952, 954, 956 within the test section 950. Such computers, servers, and/or devices may be operated independently, or may receive instructions or commands from one or more external computer devices or system components, such as the external management system 940, by way of the network 990, as indicated by line 988, through the sending and receiving of digital data.

The external management system 940 includes one or more physical computer servers 942 having a plurality of databases 944 associated therewith, as well as one or more computer processors 946 provided for any specific or general purpose. For example, the external management system 940 of FIG. 9 may be independently provided for the exclusive purpose of managing or monitoring operational or destructive testing of the one or more test objects 90 within the test section 950, or obtaining, analyzing or storing information or data regarding such testing, including such information or data that may be obtained from one or more of the sensors 952, 954, 956. The external management system 940 may be provided in connection with one or more physical or virtual services, and the servers 942 may be connected to or otherwise communicate with the databases 944 and the processors 946. The databases 944 may store any type of information or data, including digital media files or any like files containing multimedia (e.g., audio and/or video content) regarding operational or destructive testing of the one or more test objects 90, and for any purpose. The servers 942 and/or the computer processors 946 may also connect to or otherwise communicate with the external network 990, as indicated by line 998, through the sending and receiving of digital data.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those skilled in the pertinent arts will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those skilled in the pertinent arts will understand that process elements described herein as being performed by a "vehicle," an "ingress section," a "conditioning section," a "test section," an "injection system" or an "egress section" or like terms, may be automated steps performed by their respective computer systems, or implemented within software modules (or computer programs) executed by one or more general purpose computers. Moreover, process steps described as being performed by a "vehicle," an "ingress section," a "conditioning section," a "test section," an "injection system" or an "egress section" may be typically performed by a human operator, but could, alternatively, be performed by an automated agent.

The powered mover 902, the vehicle 905, the fluid tunnel 910 and/or the external management system 940, or the various components thereof, may use any network-enabled or Internet applications or features, or any other client-server applications or features including electronic mail (or E-mail), or other messaging techniques, to connect to the network 990 or to communicate with one another, such as through short or multimedia messaging service (SMS or MMS) text messages. The protocols and components for providing communication between such devices are well known to those skilled in the art of computer communications and need not be described in more detail herein.

The data and/or computer executable instructions, programs, firmware, software and the like (also referred to herein as "computer executable" components or modules) described herein may be stored on a computer-readable medium that is within or accessible by computers or computer components such as the server 942, the database 944, the control system 980, or any other computers or control systems utilized by the powered mover 902, the vehicle 905, the fluid tunnel 910 and/or the external management system 940 and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the non-transitory computer readable medium, such as a floppy drive, CD-ROM drive, DVD-ROM drive, network interface, or the like, or via external connections.

Figure 10A:
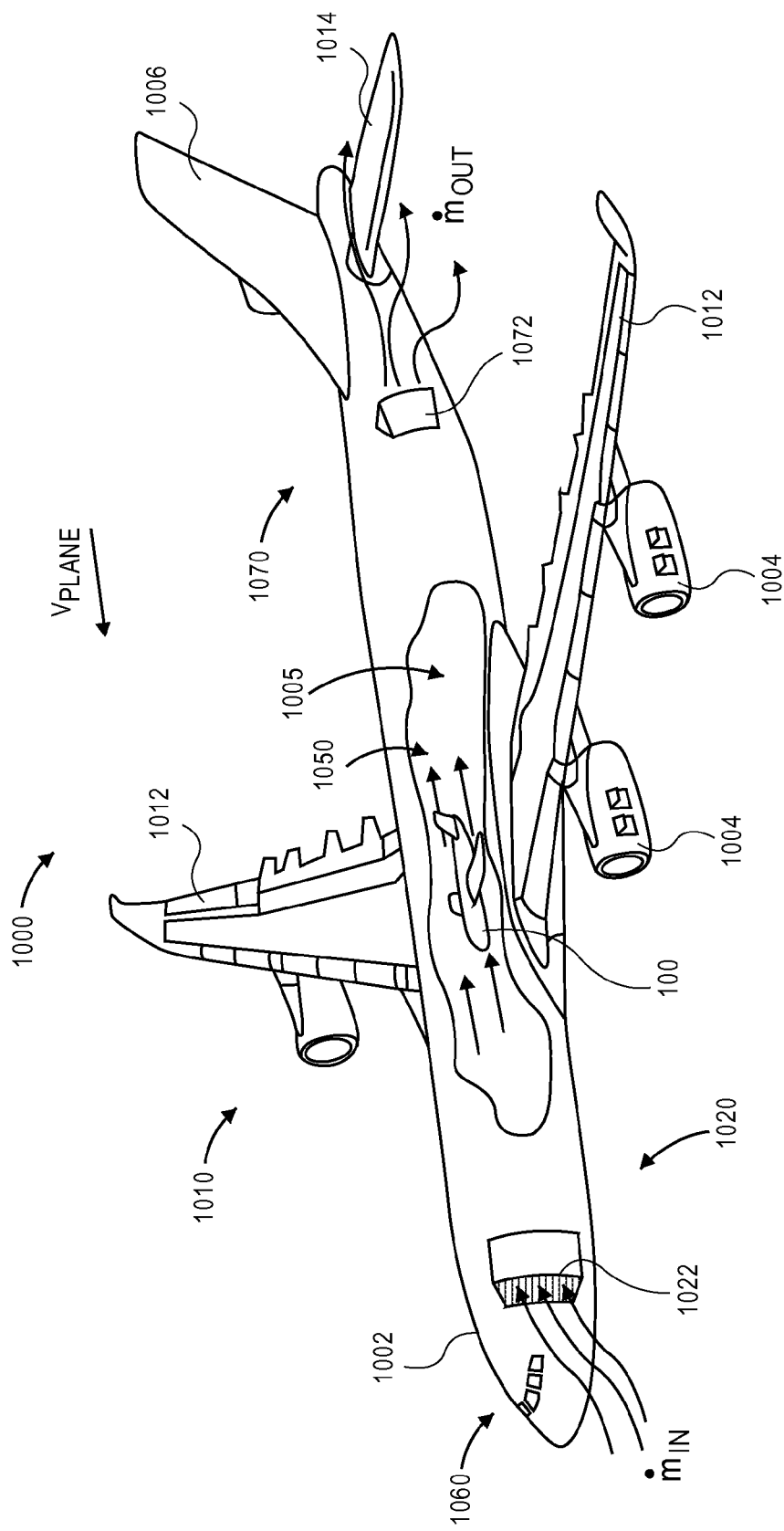
FIGS. 10A and 10B show views of embodiments of mobile tunnels, in accordance with embodiments of the present disclosure.
Figure 10B:
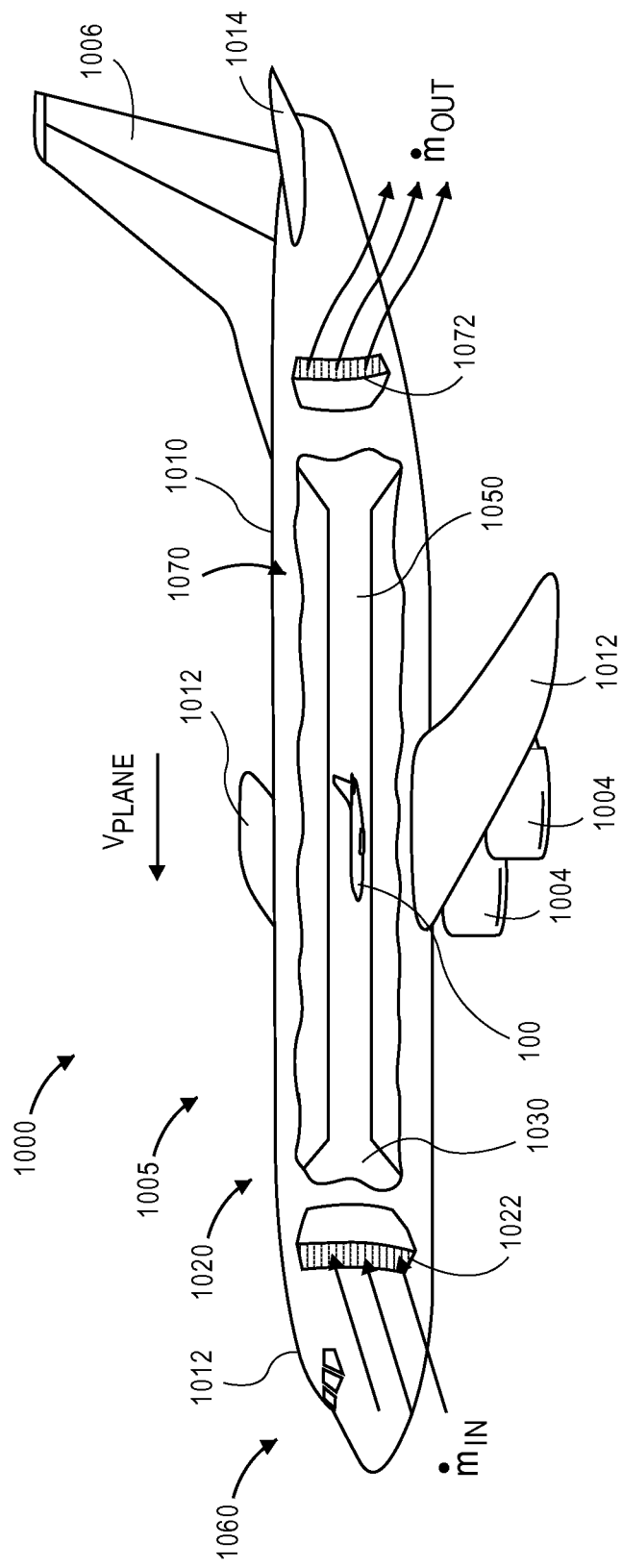

As is discussed above, the mobile tunnels of the present disclosure may be provided in any type of vehicle, and configured to divert fluid flow passing over and around the vehicle into the vehicle, in order to perform operational testing on an object provided therein. According to some embodiments, a mobile tunnel may be provided in an airplane, airship or other airborne vehicle. Referring to FIGS. 10A and 10B, views of one embodiment of a system 1000 including a mobile tunnel 1005 in accordance with the present disclosure re shown. Except where otherwise noted, reference numerals preceded by the number "10" shown in FIG. 10A or FIG. 10B indicate components or features that are similar to components or features having reference numerals preceded by the number "9" shown in FIG. 9, by the number "7" shown in FIG. 7A or FIG. 7B, by the number "6" shown in FIG. 6, by the number "5" shown in FIG. 5, by the number "4" shown in FIG. 4A, FIG. 4B or FIG. 4C, by the number "3" shown in FIG. 3A or FIG. 3B, by the number "2" shown in FIG. 2 or by the number "1" shown in FIG. 1A or FIG. 1B.

As is shown in FIG. 10A, the mobile tunnel 1005 is provided in an airplane 1010, e.g., a jumbo jet, that is configured to fly at increased altitudes and speeds. The airplane 1010 includes a plurality of engines 1004, a rudder 1006, wings 1012, and stabilizers 1014. The airplane 1010 also includes an ingress section 1020 including a plurality of air intakes 1022 provided along a fuselage of the airplane 1010, near a bow thereof. A test section 1050 is provided within the airplane 1010 having an object 100 (e.g., a UAV, or drone) therein. The test section 1050 may also include any number of channels or other flow elements (not shown) for directing or controlling the air entering the airplane 1010 via the ingress section 1020, e.g., for increasing or decreasing the pressure or velocity of the air flow, as well as one or more conditioning elements such as vanes, screens, filters or flow straightening or flow separating devices (not shown). The airplane 1010 further includes an egress section 1070 having a plurality of air outlets 1072 along the fuselage of the airplane 1010, near a stern thereof, such that the mobile tunnel 1005 defines a flow path between the air intakes 1022 and the air outlets 1072, through the test section 1050. Additionally, the airplane 1010 may further include one or more tanks or storage facilities (not shown) for storing any materials that may be injected or charged into the flow of air entering the airplane 1010 via the ingress section 1020, in order to simulate the effects of such materials on the object 100.

In accordance of the present disclosure, as the airplane 1010 travels at a speed $V_{PLANE}$, air may enter the airplane 1010 by way of the air intakes 1022 at a mass flow rate of $M_{IN}$. The air may be throttled, manipulated, or otherwise conditioned before being redirected within the airplane 1010 to pass above, below and around the object 100, and depart the airplane 1010 by way of the air outlets 1072 at a mass flow rate of $m_{OUT}$, which is substantially equivalent to mix. Embodiments of the present disclosure, such as the mobile tunnel 1005 of FIGS. 10A and 10B, are particularly well-suited for performing one or more operational tests of high-speed aircraft, such as UAVs or drones, and may utilize some of the wind passing by the airplane 1010 to simulate the conditions that may be encountered by such aircraft in flight.

Figure 11A:
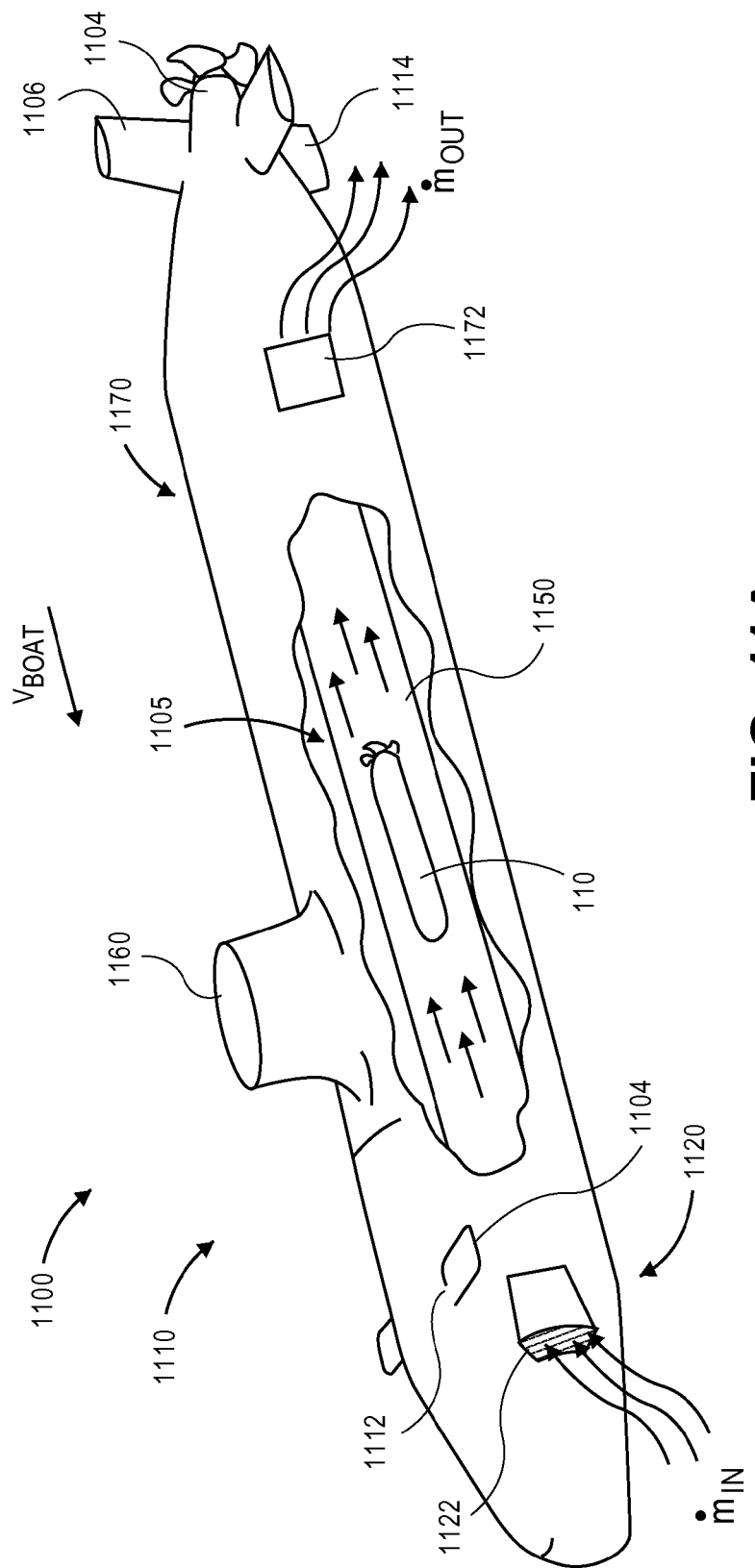
FIGS. 11A and 11B show views of embodiments of mobile tunnels, in accordance with embodiments of the present disclosure.
Figure 11B:
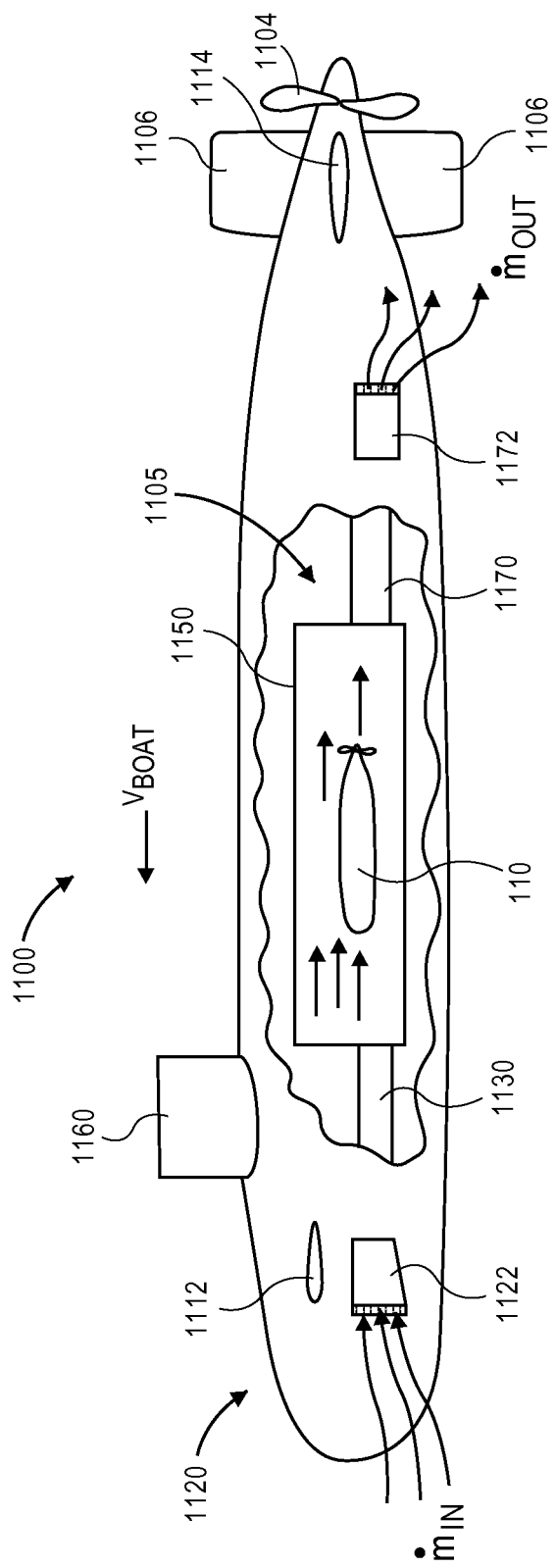

Additionally, as is also discussed above, the mobile tunnels of the present disclosure may be utilized in connection with any type of fluid. Referring to FIGS. 11A and 11B, views of one embodiment of a system 1100 including a mobile tunnel 1105 in accordance with the present disclosure re shown. Except where otherwise noted, reference numerals preceded by the number "10" shown in FIG. 11A or FIG. 11B indicate components or features that are similar to components or features having reference numerals preceded by the number "10" shown in FIG. 10A or FIG. 10B, by the number "9" shown in FIG. 9, by the number "7" shown in FIG. 7A or FIG. 7B, by the number "6" shown in FIG. 6, by the number "5" shown in FIG. 5, by the number "4" shown in FIG. 4A, FIG. 4B or FIG. 4C, by the number "3" shown in FIG. 3A or FIG. 3B, by the number "2" shown in FIG. 2 or by the number "1" shown in FIG. 1A or FIG. 1B.

As is shown in FIG. 11A, the mobile tunnel 1105 is provided in a submarine 1110 or other submersible vehicle that is configured to travel on or below a surface of water. The submarine 1110 includes a propeller 1104, a rudder 1106, bow planes 1112, and stern planes 1114. The submarine 1110 also includes an ingress section 1120 including a plurality of seawater inlets 1122 provided near a bow of the submarine 1110. A test section 1150 is provided within the submarine 1110 having an object 110 (e.g., a surface ship or submersible ship) therein. The test section 1150 may also include any number of channels or other flow elements (not shown). for directing or controlling seawater entering the submarine 1110 via the ingress section 1120, e.g., for increasing or decreasing the pressure or velocity of the seawater flow, as well as one or more flow conditioning elements, flow straightening or flow separating devices (not shown). The submarine 1110 further includes an egress section 1170 having a plurality of seawater outlets 1172 provided near a stern of the submarine 1110, such that the mobile tunnel 1105 defines a flow path between the seawater inlets 1122 and the seawater outlets 1172, through the test section 1150. Additionally, the submarine 1110 may further include one or more tanks or storage facilities (not shown) for storing any materials that may be injected or charged into the flow of seawater entering the seawater 1110 via the ingress section 1120, in order to simulate the effects of such materials on the object 110.

In accordance with the present disclosure, as the submarine 1110 travels at a speed $V_{BOAT}$, seawater may enter the submarine 1110 by way of the seawater intakes 1122 at a mass flow rate of mix. The seawater may be throttled, manipulated or otherwise conditioned before being redirected within the submarine 1110 to pass above, below and around the object 110, and depart the submarine 1110 by way of the seawater outlets 1172 at a mass flow rate of $m_{OUT}$, which is substantially equivalent to $m_{IN}$. Embodiments of the present disclosure, such as the mobile tunnel 1105 of FIGS. 11A and 11B, are particularly well-suited for performing one or more operational tests of surface ships or submersibles, such as unmanned undersea vehicles (UUV) or drones, and may utilize some of the seawater passing by the submarine 1110 to simulate the conditions that may be encountered by such aircraft during surfaced or submerged operations.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments described herein or shown in the accompanying figures refer to the operational testing of UAVs mounted within mobile wind tunnels towed by road tractors, the systems and methods are not so limited. Those of ordinary skill in the pertinent arts would recognize that any type of object may be provided within one or more of the mobile tunnels disclosed herein, and that such mobile tunnels may be accelerated to operational velocities by any means.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 8, the order in which the steps of the methods or processes are listed is not intended to be construed as a limitation on the claimed inventions, and any number of the method or process steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Although the invention has been described and illustrated with respect to exemplary embodiments thereof, the foregoing and various other additions and omissions may be made therein and thereto without departing from the spirit and scope of the present disclosure.

What is claimed is:

1. A testing system comprising:
at least one computer device;
a motorized tractor vehicle; and
a trailer joined to the motorized tractor vehicle, wherein the trailer has a wind tunnel provided therein, and wherein the wind tunnel comprises:
    at least one ingress opening extending between an exterior of the trailer and an interior of the wind tunnel;
    at least one egress opening extending between the interior of the wind tunnel and the exterior of the trailer;
    at least one test section having at least one test object provided therein, wherein the at least one test section is in fluid communication with the at least one ingress opening and the at least one egress opening,
wherein the at least one computer device is configured to perform a method comprising:
determining a velocity of the trailer; and
upon determining that the velocity of the trailer exceeds a predetermined threshold,
    operating at least one air intake valve to cause an airflow to enter the at least one ingress opening.

2. The testing system of claim 1,
wherein the wind tunnel defines a flow path extending from the at least one ingress opening to the at least one egress opening through the at least one test section, and
wherein the method further comprises:
    capturing data regarding the airflow through the at least one test section along the flow path using at least one sensor.

3. The testing system of claim 2, wherein the at least one sensor is at least one of a pitot tube, an anemometer, a pressure sensor, a humistor or an imaging device, and
    wherein capturing the data regarding the airflow through the at least one test section along the flow path using the at least one sensor further comprises:
        determining at least one of a velocity, a pressure, a humidity, a density or a viscosity of the airflow through the at least one test section along the flow path; and
        storing information regarding the at least one of the velocity, the pressure, the humidity, the density or the viscosity of the airflow through the at least one test section along the flow path in at least one data store.

4. The testing system of claim 1, wherein operating the at least one air intake valve to cause the airflow to enter the at least one ingress opening further comprises:
    identifying at least one operational standard regarding at least one evolution to be performed on the at least one test object within the at least one test section;
    identifying at least one of an air velocity or an air pressure associated with the at least one operational standard; and
    operating the at least one air intake valve to cause the airflow to enter the at least one ingress opening at the at least one of the air velocity or the air pressure associated with the at least one operational standard.

5. The testing system of claim 1, wherein the trailer further comprises an observation section disposed above the wind tunnel, and
    wherein the observation section comprises:
        a space configured for occupation by at least one person;
        the at least one computer device; and
        at least one viewing window providing a view of the wind tunnel.

6. A mobile vehicle comprising:
    a testing section configured to receive at least one test object;
    an ingress section having at least one fluid intake, wherein the ingress section is in fluid communication with the testing section, and wherein the at least one fluid intake comprises at least one fluid intake valve that is operable to open, throttle or close a flow of fluid to pass through the flow path;
    an egress section having at least one fluid outlet, wherein the egress section is in fluid communication in the testing section, wherein the ingress section, the testing section and the egress section define a flow path between the fluid intake and the fluid outlet; and
    at least one computer processor configured to at least:
        identify a first operational standard associated with a testing evolution to be performed on the at least one test object within the testing section;
        determine a velocity of the mobile vehicle using the at least one computer processor; and
        upon determining that the velocity of the mobile vehicle exceeds a predetermined threshold,
            operate at least the at least one fluid intake valve to cause the flow of fluid to pass through the flow path in accordance with the first operational standard.

7. The mobile vehicle of claim 6, further comprising:
    a conditioning section having a contraction region extending between a first portion of the ingress section having a first cross-sectional area and a second portion of the testing section having a second cross-sectional area within the flow path,
    wherein the first cross-sectional area is greater than the second cross-sectional area.

8. The mobile vehicle of claim 7, wherein the conditioning section further comprises a plurality of flow straightening tubes distributed in parallel within the flow path.

9. The mobile vehicle of claim 7, wherein the conditioning section further comprises a motorized rotor within the flow path.

10. The mobile vehicle of claim 6, wherein the testing section comprises at least one sensor, and
wherein the at least one computer processor is further configured to:
capture data regarding at least one of the testing section, the flow of fluid or the at least one test object using the at least one sensor; and
store at least some of the data regarding the at least one of the testing section, the flow of fluid or the at least one test object using the at least one sensor in at least one data store.

11. The mobile vehicle of claim 10, wherein the at least one sensor is at least one of a pitot tube, an anemometer, a pressure sensor, a humistor or an imaging device.

12. The mobile vehicle of claim 6, wherein the at least one computer processor is further configured to at least:
identify at least one material associated with the first operational standard; and
cause at least some of the at least one material to be injected from a reservoir into the flow path prior to the testing section.

13. The mobile vehicle of claim 6, wherein the test object is at least one of:
an unmanned aerial vehicle;
an unmanned undersea vehicle; or
an automobile.

14. The mobile vehicle of claim 6,
wherein the mobile vehicle has a width of at least eight feet, and
wherein the mobile vehicle is joined to a motorized vehicle.

15. The mobile vehicle of claim 6, wherein the mobile vehicle is at least one of:
a road vehicle comprising a plurality of wheels, wherein the ingress section is configured to receive air at the at least one fluid intake as the road vehicle is in motion;
an airplane, wherein the ingress section is configured to receive air at the at least one fluid intake as the airplane is in flight; or
a submersible, wherein the ingress section is configured to receive seawater at the at least one fluid intake as the submersible is in motion and wherein at least a portion of the submersible is underwater.

16. The mobile vehicle of claim 6, further comprising an observation section adjacent the testing section,
wherein the observation section comprises a viewing window and at least one computing device comprising the at least one computer processor, and
wherein at least a portion of the at least one test object is visible from the observation section by the viewing window.

17. A mobile vehicle comprising:
a testing section configured to receive at least one test object;
an ingress section having at least one fluid intake, wherein the ingress section is in fluid communication with the testing section;
an egress section having at least one fluid outlet and a catch section, wherein the egress section is in fluid communication in the testing section;
a reservoir comprising at least one material; and
an actuation valve having an outlet,
wherein the ingress section, the testing section and the egress section define a flow path between the fluid intake and the fluid outlet,
wherein the outlet of the actuation valve is aligned to inject at least some of the at least one material in the reservoir into the flow path prior to the testing section, and
wherein the catch section is configured to remove the at least some of the at least one material from the flow path prior to the at least one fluid outlet.

18. A method comprising:
providing a test object within a test section of a fluid tunnel, wherein the fluid tunnel includes at least one fluid intake and at least one fluid outlet and defines a flow path between the at least one fluid intake, the test section and the at least one fluid outlet, and wherein the at least one fluid outlet comprises a catch section;
identifying at least one operational standard associated with an evolution, wherein the at least one operational standard comprises at least one material during the evolution;
causing the fluid tunnel to travel at a first velocity;
determining that the first velocity exceeds a predetermined threshold;
causing a flow of a fluid to enter the at least one fluid intake and travel along the flow path over the test object to the at least one fluid outlet in accordance with the at least one operational standard;
injecting the at least one material into the flow of the fluid between the at least one fluid intake and the test section;
capturing information regarding at least one of the flow of the fluid or the test object using at least one sensor provided in the test section; and
storing at least some of the information regarding the at least one of the flow of the fluid or the test object in at least one data store,
wherein the catch section is configured to remove the at least some of the at least one material from the flow path prior to the at least one fluid outlet.

19. The method of claim 18, wherein the at least one operational standard further comprises at least one of an fluid velocity or an fluid pressure, and
wherein causing the flow of the fluid to enter the at least one fluid intake and travel along the flow path over the test object to the at least one fluid outlet in accordance with the at least one operational standard further comprises:
operating at least one valve to cause the flow of the fluid to enter the at least one fluid intake and travel along the flow path over the test object to the at least one fluid outlet at the fluid velocity or the fluid pressure.

20. The method of claim 18, wherein the at least one fluid intake is provided at a forward end of a forward vehicle,
wherein the at least one fluid outlet is provided at an aft end of an aft vehicle,
wherein the forward vehicle and the aft vehicle are joined by an articulator, and
wherein the fluid tunnel extends across the forward vehicle and the aft vehicle.

21. The method of claim 20, wherein the forward vehicle is coupled to a road tractor, and
wherein causing the fluid tunnel to travel at the first velocity comprises:

causing the road tractor to pull the forward vehicle and the aft vehicle at the first velocity.

\* \* \* \* \*